US010553067B2

(12) United States Patent
Alderucci et al.

(10) Patent No.: US 10,553,067 B2
(45) Date of Patent: Feb. 4, 2020

(54) CARD SELECTION AND DISPLAY AND RESTORATION

(71) Applicant: CFPH, LLC, New York, NY (US)

(72) Inventors: Dean P. Alderucci, Westport, CT (US); Mark A. Miller, Chicago, IL (US)

(73) Assignee: CFPH, LLC, New York, NY (US)

( * ) Notice: Subject to any disclaimer, the term of this patent is extended or adjusted under 35 U.S.C. 154(b) by 0 days.

(21) Appl. No.: 16/131,952

(22) Filed: Sep. 14, 2018

(65) Prior Publication Data

US 2019/0088075 A1 Mar. 21, 2019

Related U.S. Application Data

(63) Continuation of application No. 15/137,609, filed on Apr. 25, 2016, now Pat. No. 10,078,935, which is a continuation of application No. 13/616,156, filed on Sep. 14, 2012, now Pat. No. 9,320,966, which is a continuation-in-part of application No. 13/555,300, filed on Jul. 23, 2012, now abandoned, and a continuation-in-part of application No. 13/487,417, filed on Jun. 4, 2012, now Pat. No. 8,944,901, and a
(Continued)

(51) Int. Cl.
G07F 17/32 (2006.01)
A63F 13/50 (2014.01)
A63F 13/80 (2014.01)

(52) U.S. Cl.
CPC ......... *G07F 17/3211* (2013.01); *A63F 13/50* (2014.09); *A63F 13/80* (2014.09); *G07F 17/32* (2013.01); *G07F 17/3227* (2013.01); *G07F 17/3293* (2013.01)

(58) Field of Classification Search
None
See application file for complete search history.

(56) References Cited

U.S. PATENT DOCUMENTS 4,266,770 A 5/1981 Yeager
4,531,187 A 7/1985 Uhland
(Continued)

FOREIGN PATENT DOCUMENTS

JP 58-081059 5/1983
JP 10-507103 7/1998
WO WO/1996/004970 2/1996

OTHER PUBLICATIONS

U.S. Appl. No. 11/669,996, filed Feb. 2007, Lutnick et al.
(Continued)

*Primary Examiner* — Ronald Laneau

(57) ABSTRACT

Embodiments related to conducting a wagering game according to the rules of a base game includes defining a finite set of game indicia. In some embodiments the player plays multiple sequential game hand by placing a wager, receiving game indicia from the finite set cumulatively excluding any game indicia previously dealt, playing the game hand to completion, collecting the game indicia from the player and excluding the dealt game indicia from further play, and displaying at least the excluded game indicia or any winning combinations precluded by the excluded game indicia. In some embodiments the game hands continue in sequence until a restoration event, which may include a manually triggered restoration or an automatic restoration event that restores the excluded game indicia. Other embodiments are also described.

5 Claims, 13 Drawing Sheets

Related U.S. Application Data continuation-in-part of application No. 13/437,441, filed on Apr. 2, 2012, now Pat. No. 8,662,978, and a continuation-in-part of application No. 13/409,349, filed on Mar. 1, 2012, now Pat. No. 8,287,344, said application No. 13/437,441 is a continuation-in-part of application No. 12/263,768, filed on Nov. 3, 2008, now Pat. No. 8,147,307, said application No. 13/616,156 is a continuation-in-part of application No. 12/263,779, filed on Nov. 3, 2008, now Pat. No. 8,408,988, and a continuation-in-part of application No. 12/263,789, filed on Nov. 3, 2008, now Pat. No. 8,287,346, and a continuation-in-part of application No. 12/259,330, filed on Oct. 28, 2008, now Pat. No. 8,308,543, and a continuation-in-part of application No. 12/259,325, filed on Oct. 28, 2008, now Pat. No. 8,657,656, and a continuation-in-part of application No. 12/256,640, filed on Oct. 23, 2008, now abandoned, said application No. 13/409,349 is a continuation of application No. 12/256,634, filed on Oct. 23, 2008, now Pat. No. 8,137,173, said application No. 13/437,441 is a continuation-in-part of application No. 12/255,123, filed on Oct. 21, 2008, now Pat. No. 8,147,308, said application No. 13/616,156 is a continuation-in-part of application No. 12/254,485, filed on Oct. 20, 2008, now Pat. No. 9,320,963, and a continuation-in-part of application No. 12/253,343, filed on Oct. 17, 2008, now Pat. No. 9,761,082, said application No. 13/487,417 is a continuation of application No. 12/252,488, filed on Oct. 16, 2008, now Pat. No. 8,192,266, which is a continuation of application No. 12/257,649, filed on Oct. 24, 2008, now Pat. No. 8,226,460.

(56) References Cited

U.S. PATENT DOCUMENTS

| | | |
|---|---|---|
| 4,926,327 A | 5/1990 | Sidley |
| 5,255,915 A | 10/1993 | Miller |
| 5,356,145 A | 10/1994 | Verschoor |
| 5,586,766 A | 12/1996 | Forte et al. |
| 5,605,334 A | 2/1997 | McCrea, Jr. |
| 5,630,753 A | 5/1997 | Fuchs |
| 5,682,550 A | 10/1997 | Brown et al. |
| 5,692,748 A | 12/1997 | Frisco et al. |
| 5,707,287 A | 1/1998 | McCrea, Jr. |
| 5,803,808 A | 9/1998 | Strisower |
| 5,831,860 A | 11/1998 | Foladare et al. |
| 5,836,586 A | 11/1998 | Marks et al. |
| 5,851,147 A | 12/1998 | Stupak et al. |
| 5,941,769 A | 8/1999 | Order |
| 5,967,894 A | 10/1999 | Kinoshita et al. |
| 6,126,541 A | 10/2000 | Fuchs |
| 6,139,014 A | 10/2000 | Breeding et al. |
| 6,217,447 B1 | 4/2001 | Lofink et al. |
| 6,299,536 B1 | 10/2001 | Hill |
| 6,386,973 B1 | 5/2002 | Yoseloff |
| 6,585,591 B1 | 7/2003 | Baerlocher et al. |
| 6,612,926 B1 | 9/2003 | Dabrowski |
| 6,663,487 B1 | 12/2003 | Ladner |
| 6,811,486 B1 | 11/2004 | Luciano, Jr. |
| 6,811,488 B2 | 11/2004 | Paravia et al. |
| 6,823,188 B1 | 11/2004 | Stern et al. |
| 6,852,031 B1 | 2/2005 | Rowe |
| 6,869,074 B2 | 3/2005 | Miller |
| 7,056,205 B2 | 6/2006 | Odom |
| 7,086,943 B2 | 8/2006 | Mugnolo et al. |
| 7,114,718 B2 | 10/2006 | Grauzer et al. |
| 7,182,690 B2 | 2/2007 | Giobbi et al. |
| 7,341,519 B2 | 3/2008 | McMain et al. |
| 7,419,162 B2 | 9/2008 | Lancaster et al. |
| 7,425,178 B1 | 9/2008 | Odom |
| 7,431,648 B2 | 10/2008 | Odom |
| 7,523,941 B2 | 4/2009 | Thomas et al. |
| 7,530,572 B2 | 5/2009 | Thomas et al. |
| 7,611,409 B2 | 11/2009 | Muir et al. |
| 7,637,506 B2 | 12/2009 | Naicker |
| 7,717,429 B2 | 5/2010 | Lutnick et al. |
| 7,811,167 B2 | 10/2010 | Giobbi et al. |
| 7,914,369 B2 | 3/2011 | Walker et al. |
| 7,942,418 B2 | 5/2011 | Amaitis et al. |
| 8,001,079 B2 | 8/2011 | Lu et al. |
| 8,079,595 B2 | 12/2011 | Amaitis et al. |
| 8,096,555 B1 | 1/2012 | Odom et al. |
| 8,113,941 B2 | 2/2012 | Gomez et al. |
| 8,137,173 B2 | 3/2012 | Miller |
| 8,147,307 B2 | 4/2012 | Miller |
| 8,147,308 B2 | 4/2012 | Miller |
| 8,192,266 B2 | 6/2012 | Alderucci et al. |
| 8,226,460 B2 | 7/2012 | Miller |
| 8,287,346 B2 | 10/2012 | Miller |
| 8,308,543 B2 | 11/2012 | Miller |
| 8,317,620 B2 | 11/2012 | Kelly et al. |
| 8,408,988 B2 | 4/2013 | Miller |
| 8,523,183 B2 | 9/2013 | Amaitis et al. |
| 8,523,684 B2 | 9/2013 | Lutnick et al. |
| 8,657,291 B2 | 2/2014 | Lutnick et al. |
| 8,657,656 B2 | 2/2014 | Miller |
| 8,662,978 B2 | 3/2014 | Miller |
| 8,994,901 B2 | 2/2015 | Alderucci et al. |
| 9,061,203 B2 | 6/2015 | Miller |
| 9,320,963 B2 | 4/2016 | Alderucci et al. |
| 9,320,966 B2 | 4/2016 | Alderucci et al. |
| 9,761,082 B2 | 9/2017 | Alderucci et al. |
| 9,928,680 B2 | 3/2018 | Lutnick et al. |
| 10,078,935 B2 | 9/2018 | Alderucci et al. |
| 10,140,819 B2 | 11/2018 | Amaitis et al. |
| 2001/0035608 A1 | 11/2001 | Hoyt et al. |
| 2002/0068635 A1 | 3/2002 | Hill |
| 2002/0090985 A1 | 7/2002 | Tochner |
| 2002/0098888 A1 | 7/2002 | Rowe et al. |
| 2002/0103017 A1 | 8/2002 | Odom et al. |
| 2002/0155872 A1* | 10/2002 | Odom ............ A63F 1/00 463/13 |
| 2002/0195773 A1 | 12/2002 | Dunn |
| 2003/0036962 A1 | 2/2003 | Holt |
| 2003/0064784 A1 | 4/2003 | Wells |
| 2003/0064805 A1 | 4/2003 | Wells |
| 2003/0109310 A1 | 6/2003 | Heaton et al. |
| 2003/0139190 A1 | 7/2003 | Steelberg et al. |
| 2003/0176218 A1 | 9/2003 | LeMay |
| 2004/0072607 A1 | 4/2004 | Thomas et al. |
| 2004/0082373 A1 | 4/2004 | Cole et al. |
| 2004/0142742 A1 | 7/2004 | Schneider et al. |
| 2005/0037834 A1 | 2/2005 | Stern et al. |
| 2005/0059452 A1 | 3/2005 | Hartl |
| 2005/0101383 A1 | 5/2005 | Wells |
| 2005/0130728 A1 | 6/2005 | Nguyen et al. |
| 2005/0143158 A1 | 6/2005 | Odom et al. |
| 2005/0161882 A1 | 7/2005 | Miller |
| 2005/0181851 A1 | 8/2005 | Amaitis et al. |
| 2005/0187020 A1 | 8/2005 | Amaitis et al. |
| 2006/0035707 A1 | 2/2006 | Nguyen |
| 2006/0079308 A1 | 4/2006 | Asher et al. |
| 2006/0121978 A1 | 6/2006 | Hornik et al. |
| 2006/0151954 A1 | 7/2006 | Silverman |
| 2006/0183540 A1 | 8/2006 | Grauzer et al. |
| 2006/0189382 A1 | 8/2006 | Muir et al. |
| 2006/0247064 A1 | 11/2006 | Nguyen |
| 2007/0001398 A1 | 1/2007 | Walker et al. |
| 2007/0021198 A1 | 1/2007 | Muir |
| 2007/0054721 A1 | 3/2007 | Jackson |
| 2007/0111772 A1 | 5/2007 | Shuster et al. |
| 2007/0197229 A1 | 8/2007 | Kalliola |
| 2007/0243935 A1 | 10/2007 | Huizinga |
| 2007/0254732 A1 | 11/2007 | Walker et al. |
| 2007/0259709 A1 | 11/2007 | Kelly |
| 2007/0270224 A1 | 11/2007 | Abbott |
| 2008/0004802 A1 | 1/2008 | Horvitz |

(56) References Cited

U.S. PATENT DOCUMENTS

| | | | |
|---|---|---|---|
| 2008/0004996 A1 | 1/2008 | Kuehling | |
| 2008/0054568 A1 | 3/2008 | Lutnick et al. | |
| 2008/0067743 A1 | 3/2008 | Naicker | |
| 2008/0090650 A1 | 4/2008 | Tarantino | |
| 2008/0119257 A1 | 5/2008 | Stern et al. | |
| 2008/0182644 A1 | 7/2008 | Lutnick et al. | |
| 2009/0005145 A1 | 1/2009 | White | |
| 2009/0104960 A1 | 4/2009 | Kelly et al. | |
| 2009/0318217 A1 | 12/2009 | Acres | |
| 2009/0325706 A1 | 12/2009 | Geist, Jr. et al. | |
| 2010/0009737 A1 | 1/2010 | Lutnick et al. | |
| 2010/0099477 A1 | 4/2010 | Alderucci et al. | |
| 2010/0099478 A1 | 4/2010 | Alderucci et al. | |
| 2010/0099479 A1 | 4/2010 | Miller | |
| 2010/0099481 A1 | 4/2010 | Alderucci et al. | |
| 2010/0105457 A1 | 4/2010 | Miller | |
| 2010/0105458 A1* | 4/2010 | Miller | A63F 1/00 463/13 |
| 2010/0105459 A1 | 4/2010 | Miller | |
| 2010/0105461 A1 | 4/2010 | Miller | |
| 2010/0105465 A1 | 4/2010 | Miller | |
| 2010/0113119 A1 | 5/2010 | Miller | |
| 2010/0113126 A1 | 5/2010 | Miller | |
| 2010/0113137 A1* | 5/2010 | Miller | G07F 17/32 463/21 |
| 2010/0113162 A1 | 5/2010 | Vemuri et al. | |
| 2010/0120483 A1 | 5/2010 | Lutnick et al. | |
| 2011/0180993 A1 | 7/2011 | Amaitis et al. | |
| 2012/0056374 A1 | 3/2012 | Lutnick et al. | |
| 2012/0058814 A1 | 3/2012 | Lutnick et al. | |
| 2012/0094743 A1* | 4/2012 | Odom | G07F 17/3244 463/20 |
| 2016/0093170 A1 | 3/2016 | Nicely | |
| 2017/0084109 A1 | 3/2017 | Alderucci et al. | |
| 2018/0211471 A1 | 7/2018 | Lutnick et al. | |

OTHER PUBLICATIONS

U.S. Appl. No. 11/850,565, filed Sep. 2007, Lutnick et al.
U.S. Appl. No. 11/972,002, filed Jan. 2008, Amaitis et al.
U.S. Appl. No. 12/252,488, filed Oct. 2008, Alderucci et al.
U.S. Appl. No. 12/253,343, filed Oct. 2008, Alderucci et al.
U.S. Appl. No. 12/254,485, filed Oct. 2008, Alderucci et al.
U.S. Appl. No. 12/255,123, filed Oct. 2008, Miller.
U.S. Appl. No. 12/256,634, filed Oct. 2008, Miller.
U.S. Appl. No. 12/256,640, filed Oct. 2008, Miller.
U.S. Appl. No. 12/257,649, filed Oct. 2008, Miller.
U.S. Appl. No. 12/259,325, filed Oct. 2008, Miller.
U.S. Appl. No. 12/259,330, filed Oct. 2008, Miller.
U.S. Appl. No. 12/263,768, filed Nov. 2008, Miller.
U.S. Appl. No. 12/263,779, filed Nov. 2008, Miller.
U.S. Appl. No. 12/263,789, filed Nov. 2008, Miller.
U.S. Appl. No. 12/688,422, filed Jan. 2010, Lutnick et al.
U.S. Appl. No. 13/081,787, filed Apr. 2011, Amaitis et al.
U.S. Appl. No. 60/824,522, filed Sep. 2006, Lutnick et al.
U.S. Appl. No. 60/824,648, filed Sep. 2006, Lutnick et al.
"Baccarat—Learn to play like a professional with a unique free evaluation—Save Money", 4 pages; Accessed Oct. 13, 2008; http://web.archive.org/web/20010603045041/www.happyfortune.com/features.htm.
"Casino Verite Blackjack History", 8 pages; Accessed Oct. 13, 2008; http://web.archive.org/web/20010819115538/www.qfit.com/cvhist.htm.
Blackjack Table Image, 1 page; Accessed Oct. 13, 2008; http://web.archive.org/web/20010414005535/www.qfit.com/cvssb1.htm.
"Counting Cards", 1 page; Accessed Oct. 13, 2008; http://web.archive.org/web/20010715031334/www.casinosoftware.net/software/html/CC2Setup.zip.html.
"Deck of Cards.Java Programming Assignment"; 4 pages; Accessed Oct. 13, 2008 http://web.archive.org/web/20010418172543/www.cs.clemson.edu/~pargas/courses/cs241/current/assignments/spring2001/p1/DeckOfCards.html.
"Baccarat—Learn to play like a professional with a unique free evaluation—Features", 4 pages; Accessed Oct. 13, 2008 http://web.archive.org/web/20000817072936/http://www.happyfortune.com/features.htm.
Canadian Examiner's Report for Application No. 2,625,171 dated Oct. 7, 2009 (4 pages).
Notification of Transmittal of the International Search Report and Written Opinion for International Application No. PCT/US07/77646, dated Sep. 30, 2008 (11 pages).
International Preliminary Report on Patentability for International Application No. PCT/US07/77646, dated Mar. 10, 2009 (6 pages).
Olaf Vancura & Ken Fuchs, Knock-Out Blackjack, Sep. 1998, Huntington Press, 1st Edition, pp. 43-72.
Notification of Transmittal of the International Search Report and Written Opinion for International Application No. PCT/US08/52461, dated Jul. 8, 2008 (10 pages).
International Preliminary Report on Patentability for International Application No. PCT/US08/52461, dated Aug. 4, 2009 (6 pages).
Australian Examiner's Report for Australian Application No. 2008201369, dated Aug. 26, 2009 (2 pages).
Australian Examiner's Report for Australian Application No. 2007292385, dated May 28, 2010 (2 pages).
Australian Examiner's Report for Australian Application No. 2007292385, dated May 26, 2011 (3 pages).
Canadian Examiner's Report for Application No. 2,662,856, dated Aug. 19, 2011 (3 pages).
Australian Examiner's Report for Application No. 2007292385, dated Dec. 7, 2011 (3 pages).
Australian Notice of Acceptance for Application No. 2007292385, dated Feb. 29, 2012 (3 pages).
Japanese Office Action with English Translation for Application No. 2009-527543, dated Mar. 21, 2012 (8 pages).
Japanese Office Action with English Translation for Application No. 2009-518656, dated Apr. 24, 2012 (16 pages).
"Blackjack" (Japanese text), Wikipedia, Jan. 23, 2007 (retrieved on Apr. 9, 2012).
Australian Examiner's Report for Australian Application No. 2012202693, dated Jan. 14, 2013 (2 pages).
Canadian Examiner's Report for Application No. 2,662,856, dated Nov. 13, 2012 (5 pages).
Japanese Office Action with English Translation for Application No. 2009-518656, dated Apr. 16, 2013 (11 pages).
Canadian Examiner's Report for Application No. 2,625,171, dated Aug. 13, 2013 (5 pages).
Japanese Office Action with English Translation for Application No. 2012-208539, dated Feb. 4, 2014 (6 pages).
Australian Examiner's Report for Australian Application No. 2012202693, dated Oct. 14, 2014 (3 pages).
Canadian Examination Report for Application No. 2,662,856, dated Dec. 9, 2014 (5 pages).
European Search Report for Application No. 07814692.5 dated Dec. 22, 2014 (7 pages).
Canadian Examination Report for Application No. 2,625,171 dated Dec. 30, 2014 (5 pages).
Japanese Office Action for Application No. 2013-169182 dated Dec. 2, 2014 (8 pages).
European Extended Search Report for Application No. 07814692.5 dated Apr. 20, 2015 (10 pages).
Australian Examiner's Report for Australian Application No. 2014250611, dated Jul. 9, 2015 (2 pages).
Japanese Office Action with English Translation for Application No. 2012-208539, dated May 12, 2015 (6 pages).

* cited by examiner

CARD SELECTION AND DISPLAY AND RESTORATION

CROSS REFERENCE TO RELATED APPLICATIONS

This application is a continuation of U.S. patent application Ser. No. 15/137,609 filed on Apr. 25, 2016 which is a continuation of U.S. patent application Ser. No. 13/616,156 filed Sep. 14, 2012 (now U.S. Pat. No. 9,320,966 issued on Apr. 26, 2016) which is a continuation in part of Ser. No. 13/487,417, filed on Jun. 5, 2012 (now U.S. Pat. No. 8,944,901 issued on Feb. 3, 2015), which is a continuation of Ser. No. 12/252,488, filed Oct. 16, 2008 (now U.S. Pat. No. 8,192,266 issued on Jun. 5, 2012).

This application is a continuation in part of Ser. No. 12/253,343, filed Oct. 17, 2008.

This application is a continuation in part of Ser. No. 12/254,485, filed Oct. 20, 2008.

This application is a continuation in part of Ser. No. 13/409,349, filed Mar. 1, 2012 (now U.S. Pat. No. 8,287,344 filed Oct. 16, 2012), which is a continuation of Ser. No. 12/256,634 filed on Oct. 23, 2008 (now U.S. Pat. No. 8,137,173 issued on Mar. 20, 2012).

This application is a continuation in part of Ser. No. 12/256,640, filed on Oct. 23, 2008.

This application is a continuation in part of Ser. No. 13/555,300, filed Jul. 23, 2012, which is a continuation of Ser. No. 12/257,649 filed Oct. 24, 2008 (now U.S. Pat. No. 8,226,460 issued on Jul. 24, 2012).

This application is a continuation in part of Ser. No. 12/259,325, filed on Oct. 28, 2008 (now U.S. Pat. No. 8,657,656).

This application is a continuation in part of Ser. No. 12/259,330, filed Oct. 28, 2008 (now U.S. Pat. No. 8,308,543 issued on Nov. 13, 2012).

This application is a continuation in part of Ser. No. 13/437,441, filed Apr. 2, 2012 (now U.S. Pat. No. 8,662,978 issued on Mar. 4, 2014), which is a continuation-in-part of each of Ser. No. 12/255,123, filed on Oct. 21, 2008 (now U.S. Pat. No. 8,147,308 issued on Apr. 3, 2012) and U.S. patent application Ser. No. 12/263,768, filed on Nov. 3, 2008 (now U.S. Pat. No. 8,147,307 issued on Apr. 3, 2012).

This application is a continuation in part of Ser. No. 12/263,779, filed Nov. 3, 2008 (now U.S. Pat. No. 8,408,988 issued on Apr. 2, 2013).

This application is a continuation in part of Ser. No. 12/263,789, filed Nov. 3, 2008 (now U.S. Pat. No. 8,287,346 issued on Oct. 16, 2012).

All of the previously mentioned applications are hereby incorporated herein by reference.

DESCRIPTION

Embodiments Set A

Figure 1:
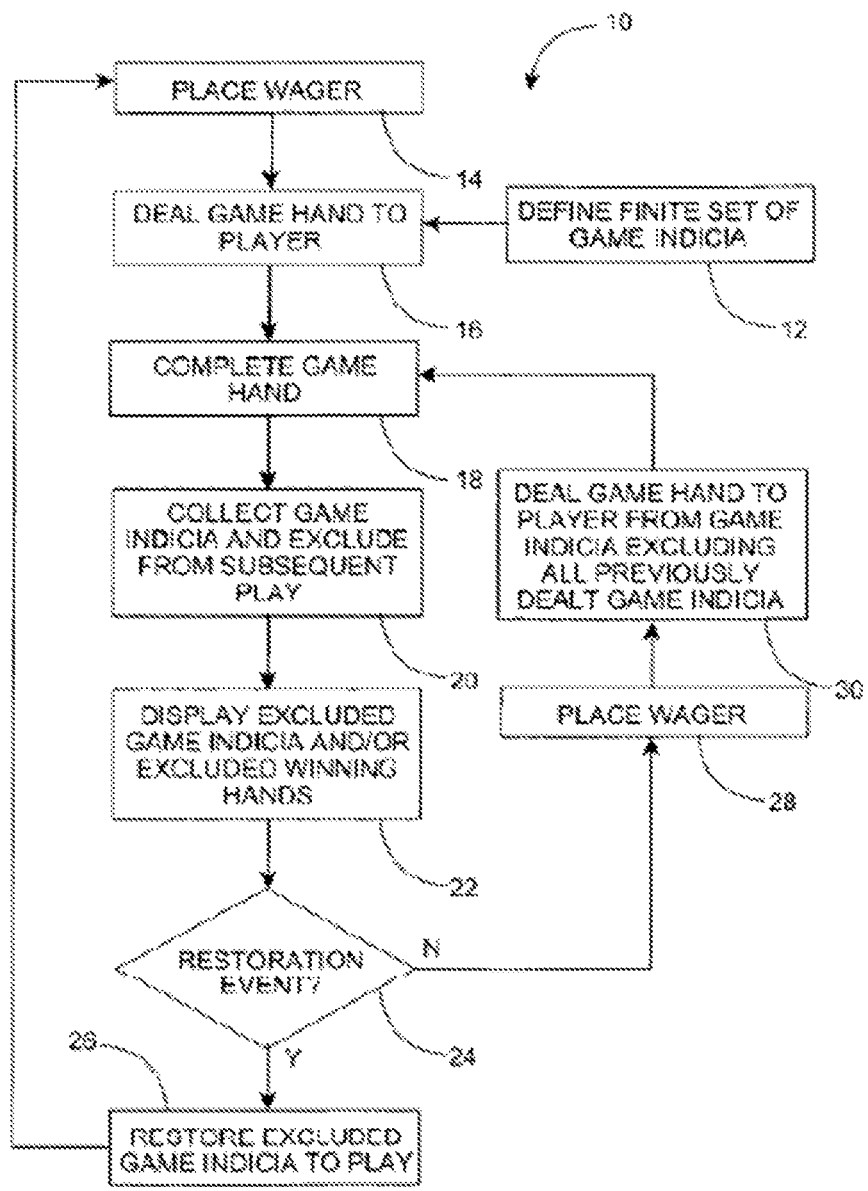
FIG. 1 is a flow chart of a method according to an embodiment of the present invention directed to multiple sequential game hands.

U.S. patent application Ser. No. 09/977,138 entitled "Electronic Card Game and Method," filed Oct. 12, 2001, U.S. Provisional Application Ser. No. 60/241,644 entitled "Electronic Video Poker Game and Method," filed Oct. 19, 2000, U.S. patent application Ser. No. 09/942,520 entitled "Live And Electronic Wagering And Lottery Game," filed Aug. 29, 2001, U.S. Provisional Application Ser. No. 60/229,665 entitled "Live and Electronic Wagering and Lottery Game," filed Aug. 31, 2000, and U.S. patent application Ser. No. 11/007,108, entitled "Method of conducting a wagering game with continuous depletion," filed Dec. 7, 2004 are all hereby incorporated herein by reference. Embodiments of the present invention relate to games. Some embodiments relate to a method for conducting multiple hands of a game. In some implementations, a game may involve a single finite game indicia set that cumulatively excludes game indicia previously dealt until a restoration event occurs.

There are many known casino games that use indicia to determine the outcome of the game. For example, many casino games of chance utilize reels displaying a fixed set of award symbols. These reel games are commonly referred to as reel slot machines or slot machines.

Slot machines can contain any number of reels, although most slot machines contain three, four, or five reels, and any number of pay lines, although most slot machines include one, three, five, eight, or nine pay lines. Each reel on a slot machine may index at a plurality of positions or stops, each of which contains a symbol or a blank. The number and location of index positions can vary depending upon the model type of each game but all instances, are fixed. These model types are determined by a variety of award tables and corresponding combinations of reel symbols. As noted above, the combination of symbols displayed when the reels index determines whether the player has won or lost.

The player may place a wager to initiate play of a slot machine. In some implementations, the player can place multiple wagers to, as described previously, increase the payout amounts, increase the number of active pay lines, or both. Often, the specific wagering structure dictates the allocation of multiple coin wagers. The reels may be randomized, i.e. mechanically or electronically "spun," and the combinations of reel symbols index across the pay line or pay lines are examined for winning combinations. Winning combinations are rewarded according to the pay table which may take into account the size of the wager.

Some implementations of video poker are well known (e.g., video draw poker, video stud poker, etc.). In some games of video draw poker, a gaming device is provided wherein the player makes a wager and the device's processor selects (e.g., from a data structure containing data representing cards in a deck of playing cards) five cards to be displayed face up to represent an initial hand. The player selects which, if any, of the five cards of the initial hand to hold and prompts the processor to discard the remaining cards. The discarded cards are replaced with replacements (e.g., selected from the data structure) to produce a final hand outcome of a five card poker hand. The video draw poker device may compare the final outcome to the predetermined winning combinations, which may also be stored in a data structure, these combinations frequently representing ranked poker hands. If the player's final outcome matches a winning combination, the player is rewarded. Otherwise, the final outcome may be deemed to be a loss and the player's wager may be retained.

In a variation of video draw poker, multiple hands may be provided. As with conventional video draw poker, the device's processor may randomly deal five cards to a player for an initial hand. The player may select which, if any, of the five cards of the initial hand to hold. Prior to drawing replacement cards for the initial hand, the held cards may be copied into the other hands. The player may prompt the processor to discard the remaining cards and additional cards may be drawn to replace the discarded cards. The processor may then repeat the draw step for the additional hands. Thus, a player receives multiple opportunities to draw to the same held cards.

Blackjack is a well known card game played in casinos. The object of the game is to have a final hand total closer to twenty-one than the dealer's hand without exceeding twenty-one. For purposes of calculating the final hand total, each card has a value equal to its face value except face cards, which have a value of ten, and aces, which may have a value of eleven or one as the player selects or as required to prevent the player from exceeding twenty-one. In conventional Blackjack, the suit of the cards is not relevant to the outcome of the game.

The form of Blackjack played in some casinos is played between a dealer, representing the house, and at least one player. In a typical Blackjack game, each player makes a wager in a wagering area on a playing surface. The dealer deals two cards to each player and two cards, one card face up and the other face down, to himself or herself. Any player receiving a natural twenty-one or Blackjack, i.e. a total of twenty-one in the initial dealt hand, is immediately rewarded, typically at a rate of 2:1 or 3:2, and play is terminated as to that player. Each remaining player examines his or her hand and decides whether to hit, i.e. receive another card, or stand, i.e. receive no further cards and finish play with the player's current hand. A player may hit as many times as the player wishes as long as the player does not bust, i.e. have a cumulative total greater than twenty-one. When a player busts, that player's wager is immediately collected and play is terminated as to that player.

A player may also have additional options available depending on the initial hand dealt and the house rules. For example, a player may have the option of "doubling down." Although the availability of the double down option varies depending on each casino's house rules, the option allows a player to double the player's wager in exchange for a single additional card. Some house rules permit doubling down on initial hand totals of ten or eleven only, other house rules permit doubling down on any initial hand total.

Another option available to a player is the option of "splitting." If a player receives a pair, i.e. two cards having the same face value, in his initial hand, most house rules permit the player to split the pair and use each card as a basis for a separate hand. For example, if a player is dealt a pair of eights, the player may choose to split the pair and continue play with two hands each having an eight and an additional dealt card as an initial hand. Each of those individual hands is then played independently by hitting, standing, or, under some house rules, doubling down or further splitting.

After all the players have played their hands, the dealer reveals the face-down card in the dealer's hand and completes the dealer's hand according to established house rules. That is, the casino uses established rules to eliminate the dealer's discretion. The dealer hits or stands as the house rules dictate, and resolves the wagers. In resolving the wagers, players with a final hand total closer to twenty-one than the dealer's final hand total are rewarded at even money. Conversely, wagers are collected from players with a final hand total further from twenty-one than the dealer's final hand total. If the dealer busts, all players who did not bust or receive a Blackjack are rewarded at even money. If the player and dealer push, i.e. have the same final hand total, the player's wager is returned.

Some players may believe that a drawback to any of these games is that they are well known and may provide little suspense in play. That is, as a player plays, the game is static. Each game is a separate trial using the same base set of symbols. Additionally, while many different types of bonus pay outs have been created, some players may desire bonus pay outs created in which the likelihood of obtaining the payout increases with additional play.

It should be recognized that any game or set of games may be played in a live, electronic and/or any other version.

Some embodiments of the present invention include a method for conducting a wagering game. The method can be applied to any base game using a set of game indicia. The base game includes, but is not limited to, games in which a player plays the game indicia originally dealt, such as slot machines, lotto, Bingo, stud poker, or the like; games in which players obtain additional game indicia during the game (either at the player's option or automatically), such as Blackjack or twenty-one and poker; and games in which a player may opt to discard and replace game indicia, such as draw poker. The present method may also be applied to single player or multi-player games.

In some embodiments, a finite set of game indicia are defined. Optionally, the finite set of game indicia are ordered. Some methods can be thought of as a multi-hand game. In one optional embodiment, the game hands are dealt sequentially; in an alternate embodiment, the game hands are dealt simultaneously. In either case, the player may place a wager for a game hand and game indicia are dealt to the player from the finite set cumulatively excluding all game indicia dealt in previous game hands, if any. The player plays the game hand to completion according to the base game. A determination is made whether the game hand forms a winning hand according to the base game. In one optional embodiment, this determination may be made by comparing the game hand to a schedule of game hands. In another optional embodiment, this determination may be made by comparing the game hand to one or more other player's and/or dealer's game hands.

In some embodiments, game indicia dealt are collected and, along with all game indicia dealt in previous game hands, are excluded from play in a subsequent game hand. At least one of (1) the inventory of the game indicia from the finite set cumulatively excluding all game indicia dealt in previous game hands or (2) winning hands including one or more excluded game indicia is displayed to the player. Optionally, both may be displayed.

In an optional embodiment in which multiple game hands are dealt simultaneously, the process is repeated for each game hand. Optionally, the player may be allowed to select the order in which game hands are conducted.

In an optional embodiment in which multiple game hands are dealt sequentially, the process is repeated for additional sequential game hands. Specifically, the steps of placing a wager, dealing game indicia, completing a game hand, collecting and excluding dealt game indicia, and displaying the game indicia inventory and/or the winning hands eliminated by the exclusion of game indicia, are repeated until a restoration event.

In some embodiments, the restoration event may include at least a manual restoration event, such as a player triggered restoration. In an optional multi-player embodiment, only one player may be eligible to trigger a manual restoration event on any game hand. Optionally, the restoration event may also include an automatic restoration event, such as the dealing of a quantity of game indicia or the conducting of a quantity of game hands. In a further optional embodiment, the restoration event includes a manual restoration event and an automatic restoration event, whichever occurs first. Upon a restoration event, excluded game indicia are restored to the finite set. In an optional embodiment in which the finite set is ordered, a restoration event also causes a reordering of the finite set.

In an optional embodiment, the player is restricted from placing a greater wager and/or altering the denomination of the wager in the additional sequential game hands. That is, in such an optional embodiment, the player may only change the wager size and/or denomination immediately following a restoration event.

In an optional embodiment directed to multi-denomination wagering, a plurality of wager denominations are defined. The game hand history is separately tracked for play at each wager denomination.

It should be recognized that all embodiments are optional whether or not they are specifically referred to as optional. A description of an embodiment is a description of an example that may or may not be included in some methods and/or apparatus.

Figure 2:
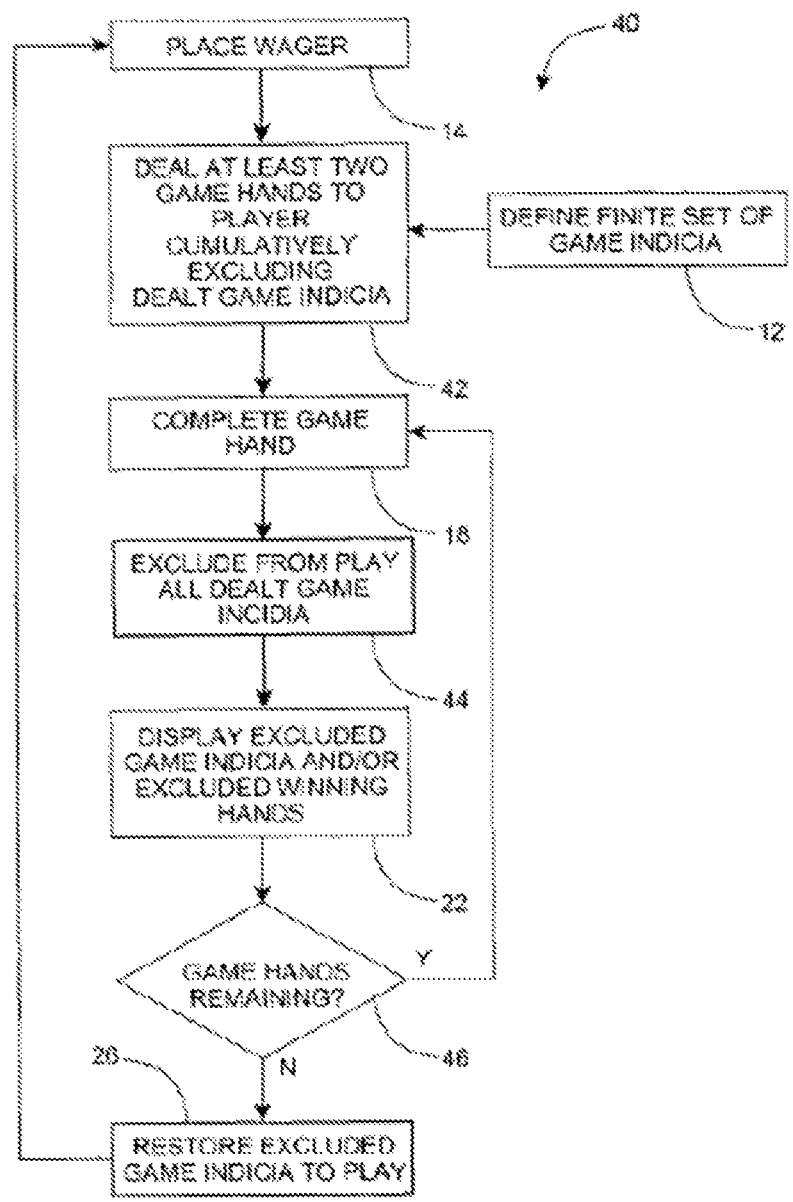
FIG. 2 is a flow chart of a method according to an embodiment of the present invention directed to multiple simultaneous game hands.

Reference is now made to the figures wherein like parts are referred to by like numerals throughout. As shown in FIGS. 1 and 2, some embodiments of the present invention include a method 10 for conducting a wagering game. Various methods could be implemented in a gaming machine, live game, conducted via computer network or Internet, or implemented in any other form.

Some methods are directed for use in combination with a base game. The base game may be a pre-existing base game or may be based on a pre-existing base game. Alternatively, the base game may be different from existing games. Among other purposes, the base game rules serve to guide the steps for completing a game hand and determining whether a game hand is a winning hand.

In this regard, it is noted that various methods could be used in conjunction with any base game. For example, the base game may include rules for the completion of a game hand in which a player plays the game indicia dealt, such as in a slot game, lotto, Bingo, stud poker game, or the like. Similarly, the base game may include rules for the completion of a game hand in which a player receives additional game indicia, either automatically or at the player's option, such as in Blackjack or twenty-one, Baccarat, or the like. Additionally, the base game may include rules for the completion of a game hand in which a player may discard and replace game indicia, such as in draw poker or the like. Examples of such games are given below. It is noted that these examples merely illustrate how various methods could be applied to various base games and should not be considered restrictive, since methods could be adapted to any other base game.

The base game rules may also vary according to the rules determining whether a game hand is a winning hand. Various methods could be applied to any base game without regard to how a winning hand is determined. For example, the base game rules may include determining a winning hand by comparing the game hand to a standard, such as a pay table. Similarly, the base game rules may include determining a winning hand by comparing the game hand to a dealer's hand, or one or more player's hand.

The base game may include single player or multi-player games. While various methods could be conducted the same whether a single player or multiple players are playing, in an optional embodiment directed to multi-player games, an optional rule could be implemented in which only one player is eligible to cause a manual restoration event during any game hand. As discussed in greater detail below, the eligibility may rotate among the players in such an optional embodiment.

Method 10 could be implemented for multiple sequential game hands, such as shown in the optional embodiment of FIG. 1, or for multiple simultaneous game hands, such as the method 40 shown in the optional embodiment of FIG. 2. Turning first to FIG. 1, the example embodiment includes defining 12 a finite set of game indicia. The game indicia may take any form including, but not limited to, playing cards, numbers, Bingo numbers, slot reel symbols, slot reel stops, or any other indicia. The finite set may include any quantity of game indicia, may include repeated game indicia, and may include multiple "sets" of game indicia, such as multiple decks of cards. That is, by "finite" it is intended that the finite set be closed so that exclusion or depletion, as described below, can occur.

Referring generally to FIGS. 1 and 2, the player places 14 a wager. In an embodiment directed to multiple sequential game hands, as shown in FIG. 1, the player places a wager for each game hand. Optionally, the wager may be controlled in that the player's options for altering a wager and/or wager denomination between restoration events may be limited. This is described in greater detail below. In an embodiment directed to multiple simultaneous game hands, as shown in FIG. 2, the present method may require only a single wager for participation or may require a separate wager for each game hand.

Returning to FIG. 1, a game hand is dealt 16 to the player. By "dealt" it is meant that game indicia are assigned to a player. In this regard, it is intended that slot reel symbols, Bingo numbers, lotto numbers, Keno numbers, playing cards, or any other game indicia may be "dealt." In the initial game hand, i.e. a game hand dealt 16 immediately after a restoration event, the game indicia may be dealt from a complete finite set in some embodiments. In subsequent game hands, discussed in greater detail below, the game indicia may be dealt 30 from the finite set excluding previously dealt game indicia in some embodiments. That is, after a game indicia is dealt it may be excluded from subsequent play until a restoration event in some embodiments. For example, in an embodiment in which the finite set is a single deck of playing cards, a dealt game hand of K heart 9.diamond 10.diamond. 3 club 7 hearts would mean that these cards are depleted from the finite set and, thus, there are no King of hearts, nine of diamonds, ten of diamonds, three of clubs, or seven of hearts available in the single deck inventory from which subsequent game hands will be dealt until a restoration event. It should be recognized that such depletion and finite sets may not be included in all embodiments, and/or other methods may be used, as described in more detail below.

With continued reference to FIG. 1, the player may play 18 the game hand to completion according to the rules of the base game. As discussed above, the precise base game can vary and, in fact, it is contemplated that embodiments of the present invention could be applied to any base game. Once the game hand is completed, the game hand may be assessed to determine whether the game hand is a winning hand and whether the player is entitled to an award.

In some embodiments, the game indicia of the game hand are collected 20, i.e. removed from play. That is, the player does not carry any of the game indicia to the next game hand in some such embodiments—in this sense, each game hand is separate because each game hand is separately dealt. Additionally, all dealt game indicia are excluded from further from play in a subsequent hand until a restoration event in some embodiments. This "exclusion" of game indicia dealt may allow the depletion of game indicia, optionally down to zero, from the universe of game indicia that can be dealt in a subsequent game hand. That is, with dealt game indicia excluded from subsequent play, the total inventory of game indicia is reduced and the inventory of the specific game indicia dealt is reduced, and may reach a zero balance, thereby reducing or eliminating the possibility that a game indicium will be dealt in a subsequent play in some embodiments. This, in turn, could eliminate certain winning hands from being dealt. For example, in a game using one deck of playing cards, if a player is dealt four Jacks in a game hand then a Royal Flush, i.e. a straight flush of ten through Ace, has been eliminated from subsequent hands by the depletion to zero inventory of the Jacks, unless a restoration event occurs.

In some embodiments, the results of the exclusion of dealt game indicia is available to the player by displaying 22 the constitution of the finite set excluding the dealt game indicia (or conversely by displaying the dealt game indicia), by displaying 22 the winning hands eliminated as a result of the exclusion of dealt game indicia (or conversely by displaying only the winning hands that can still be dealt), or both. As mentioned above, other embodiments may not include a finite set or excluding as described so far and/or may include other methods. Such alternatives are discussed below.

In some embodiments, additional game hands are conducted with the player placing 28 a wager, receiving a game hand of game indicia, and playing the game hand to completion. As noted above, these additional game hands may be dealt 30 from the finite set excluding any previously dealt game indicia in some embodiments. As each additional game hand is completed, the dealt game indicia from the additional game hands may be removed from play, e.g. collected from the player, and excluded from the inventory of game indicia available for subsequent game hands in some embodiments. As above, the results of the exclusion are displayed to the player in some embodiments.

It is noted that in an optional embodiment, the size of the wager in the additional game hands may be controlled. For example, the player may be restricted in the amount by which the player can increase the wager. That is, in an optional embodiment, the bet spread, i.e. the spread between the minimum wager and the maximum wager, may be different in the additional game hands than in a hand played with the full finite set of game indicia. In a further optional embodiment, not permitted to increase the wager at all during the additional game hands. Rather, the player of such an optional embodiment would only be permitted to increase the player's wager in a game following a restoration event. In other words, in such an embodiment, a player may increase the player's wager only when the finite set is restored of all the excluded game indicia.

In this regard, it is also contemplated that various methods may be adapted to a game in which multiple wager denominations are established. In an optional embodiment of such a multi-denomination game, the player may be restricted in changing denominations in that the player of such an optional embodiment would only be permitted to change the player's wager denomination in a game following a restoration event. That is, as above, in such an optional embodiment a player may change wager denomination only in some circumstances, such as when the full finite set of game indicia is available in some embodiments. One purpose of such optional wager and wager denomination restrictions are to control the house edge as additional game indicia are excluded from play in some embodiments, or other circumstances regarding a deck are changed in some embodiments.

As an example, in one optional embodiment, a player is enabled to place a wager of anywhere from one to five hundred credits without allowing players too great an ability to reduce the house edge. This is accomplished in this optional embodiment by dividing the wagers into wager denomination levels in which the maximum wager in any one wager denomination level is a predetermined multiple of the minimum wager. The multiple could depend upon the specific game; for example, in a Blackjack-type game, the multiple could be two, in other games, the multiple could be five. Thus, a first wager denomination level is one credit to five credits, a second wager denomination level is five credits to twenty-five credits, a third wager denomination level is ten credits to fifty credits, a fourth wager denomination level is twenty-five credits to one hundred twenty-five credits, and a fifth wager denomination level is one hundred credits to five hundred credits. Thus, a player is permitted to wager anywhere from one to five hundred credits, or at discrete plateaus therein, but may need to change wager denomination to do so.

According to some embodiments, the inventory may be restored or reshuffled to a full contingency before a player can increase the wager denomination. For instance, if a player is playing five credits per hand then wishes to raise the wager to one hundred credits per hand, the player cannot do so at the current wager level which would, at most, permit a wager of twenty-five credits per hand. Thus, the player in such an example, would need to change wager denomination to place a wager of one hundred credits per hand. As noted, a change in wager denomination would, in this optional embodiment, be allowed if the player triggers a manual restoration event, i.e. restores the game indicia to the full finite set. It should be understood that other embodiments may not include shuffling, finite sets, and/or may include any other methods.

Returning to the optional embodiment of FIG. 1, the additional game hands are dealt until a restoration event 24. The restoration event 24 may include a manual restoration event alone or in combination with an automatic restoration event in some embodiments. It should be recognized that such restoration events may not be included in some embodiments and may take any form in other embodiments. In one optional embodiment, both a manual restoration event and an automatic restoration event are provided, and the restoration occurs based on whichever occurs first. For example, a manual restoration event may include the player triggering a restoration. Similarly, the automatic restoration event may include the dealing of a predetermined quantity of game indicia and/or the conducting of a predetermined quantity of game hands. Thus, in an embodiment in which both manual and automatic restoration events are permitted, the player may trigger a restoration or may wait until a restoration automatically occurs after a certain quantity of game indicia are dealt and/or a certain quantity of game hands are conducted.

In an optional embodiment directed for use in a multi-player game, each player may be able to manually trigger a restoration. However, in another optional embodiment for multi-player games, only one player is eligible to manually trigger a restoration on any game hand. In a further optional embodiment, the eligibility to manually trigger a restoration rotates among the players.

In some embodiments, upon a restoration event, the excluded game indicia are restored 26 to the set of game indicia available for play. In other words, the full finite set of game indicia are available in a game hand dealt immediately after a restoration event. Optionally, in games in which the finite set is ordered, and game hands are dealt from the ordered finite set, a restoration event may optionally restore excluded game indicia and reorder the finite set. It should be recognized that other embodiments may not include a finite set, may not include restoration events, may not include a set of indicia, and/or may include any other method.

According to an optional embodiment of the present method, it may be desirable to track game hands to maintain a history of the game indicia available, i.e. the state of depletion, and the game hands dealt. In a multi-denomination embodiment of the present invention, the game history may be separately tracked and stored for each wager denomination plus the total games history of a machine.

The optional embodiment of FIG. 2 is one possible version of the present method 40 applied to a game in which multiple, i.e. at least two, simultaneous game hands are dealt. That is, in the embodiment of FIG. 2, rather than dealing game hands sequentially from a continuously depleted set of game indicia, the game hands are dealt simultaneously from a continuously depleted set of game indicia.

As described in some embodiments above, a finite set of game indicia may be defined 12. In such an optional embodiment, the player places 14 a wager and multiple game hands are simultaneously dealt 42 to a player. In this optional embodiment, the multiple game hands are dealt 42 from the finite set of game indicia. The game hands are played 18 to completion. Optionally, the player may choose the order in which the game hands are completed. Alternatively, the player may follow a predefined order in playing the game hands. As the player completes each game hand, the game indicia of the dealt hands along with any additional game indicia dealt to a game hand may be excluded 44 from the game indicia available in completing another game hand in some embodiments. That is, throughout the conduct of the method, the available game indicia are depleted by the game indicia dealt in some embodiments. At least the game indicia inventory or the winning hands excluded by the depletion are displayed 22 to the player in some embodiments. The process is repeated until there are no game hands remaining 46. After all the game hands are completed, the excluded game indicia are restored 26 for the next subsequent deal in some embodiments.

Below are given some examples of games and possible methods for resolving whether a game hand is a winning hand. It is specifically noted that these games are merely examples and should be considered neither limiting to the present method nor the only possible applications of the present method.

Numbers, Lotto, or Bingo-Type Games

This optional game may be played in a live or electronic version. In some embodiments, the game may be played with an inventory of game indicia. The game indicia may take many different forms, but in an optional embodiment, a fully constituted inventory consists of indicia between the numbers of 30 and 500 simulated symbols or live balls. For the purpose of explaining this optional embodiment of the game, the term "cage" refers to the location of the inventory of game indicia and the word "ball(s)" to refer to the game indicia available for dealing, even though it is contemplated that the game may be electronic in nature and there may be no physical "cage" or "ball(s)" but rather electronic representations thereof or no such elements at all.

In an example game, the cage is loaded with 63 balls and is continually spun and mixed by a random number generator ("RNG") until the first ball is drawn, similar to Bingo. Some of the ball symbols have numbers on them and the others are just blank. Each game version may have one or more duplicate game indicia. One example of the cage inventory may be:

| Ball Symbol | Number of Balls |
| --- | --- |
| 7 | 3 |
| 11 | 5 |
| 1 | 15 |
| 2 | 9 |
| 3 | 7 |
| Blanks | 24 |

In this example embodiment, when a player activates the "Play" button on the electronic game embodiment with a fully constituted cage inventory of balls, i.e. the complete finite set of game indicia, the RNG selects the first ball symbol and continues to select a ball until the first game play is complete. In this optional embodiment, the screen has an array of three rows of three spaces each for a total of nine spaces for the selected balls. Thus, in such an optional embodiment, a player has a choice to wager on anywhere between one pay line and eight pay lines, i.e. any of the three horizontal rows, three vertical columns, or two diagonals. A winning combination may be obtained if three matching game indicia line up in a row, column, or diagonal. Example of a pay table:

| Symbol Combination | 1 Unit Bet | 2 Units Bet | 3 Units Bet | 4 Units Bet | 5 Units Bet |
| --- | --- | --- | --- | --- | --- |
| 7's | 2,000 | 4,000 | 6,000 | 8,000 | 10,000 |
| 11's | 200 | 400 | 600 | 800 | 1,000 |
| Any 7 or 11's | 50 | 100 | 150 | 200 | 250 |
| 3's | 50 | 100 | 150 | 200 | 250 |
| 2's | 20 | 40 | 60 | 80 | 100 |
| 1's | 10 | 20 | 30 | 40 | 50 |
| Any 1, 2 or 3's | 5 | 10 | 15 | 20 | 25 |
| Blanks | 1 | 2 | 3 | 4 | 5 |

In this example embodiments, game indicia are depleted from the cage as each ball is drawn out of the game indicia cage inventory. In an optional embodiment, the first 3 balls called are for the center horizontal row of spaces first, then the other balls are called to fill the remaining rows one at a time until nine balls are selected. As each ball symbol is selected to form a play line, it is deleted from the respective indicia symbol inventory stored in the cage. Indicia depletion from the cage not only reduces the total inventory, but each separate group of symbols (numbered balls) may go to a zero balance and not be available for the next depleted portion of the game.

In this optional embodiment, a player may deplete up to fifty-four balls from the cage before an automatic restoration event. In such an optional embodiment, this equates to six complete game hands from a fully constituted cage, before the cage is automatically restored with the previously excluded inventory. The precise point of restoring the inventory will vary between versions, but factors that may be considered in triggering an automatic restoration could include the house edge in the game and any regulatory requirements regarding the minimum and maximum pay outs. Nonetheless, certain win combinations of indicia may be impossible to obtain as the inventory is depleted and, in this optional embodiment, these are displayed to the player. That is, when an indicia symbol or combination of symbols that can form a winning combination of a listed payout is excluded from the game indicia available prior to the start of new round or game, the player will be notified. In this optional embodiment, players are also informed of the remaining cage inventory after at least one round of game has been played, so the player has available the information to play based upon the depletion.

The present optional embodiment may also include a manual restoration event. That is, a player may have the ability to restore at will the excluded game indicia to the inventory. In this optional embodiment, the player may use a "Restore" button to control the point of playing with depleted inventory and the associated reduced or deleted winning combination pay outs.

In this example embodiment, the distinction between the automatic restoration event and the manual restoration event is that a player has no control or input in the automatic restoring point. Rather, in this optional embodiment, the excluded game indicia are automatically restored after a certain amount of game indicia has been drawn. However, using the manual restoration event, in this case the "Restore" button, a player can control the early restoring of the cage anytime after a game hand is completed.

In an optional embodiment, the "Restore" button may also be used to alter the sequence of any new numbers being selected from a full cage if pressed before the "Play" button is pressed. In such an optional embodiment, the RNG that controls the mixing and selection of game indicia is clock operated, and by utilizing the "Restore" button, it alters the timing position of the clock. In other words, if a player were to use the "Restore" button before pressing the "Play" button, the sequence of selected numbers would be different than if the "Play" button was used first. Thus, this optional embodiment allows players the ability have some input into the selection process of the RNG. For example, in U.S. Pat. No. 6,581,935, which is hereby incorporated by reference, an embodiment is described in which actuating a "Restore" button before a "Play" button alters the clock of a clock-based RNG thereby providing a different seed for randomly selecting game indicia.

In this example embodiment, a skill factor of knowing when the optimum time to call for an early restoration of the cage inventory based upon depletion and remaining symbol indicia may be beneficial. Proper use of the "Restore" button may add to the expected value payout of the game. The optimal play strategy of restoring the inventory at the precise time relative to the possible remaining is not always apparent, and players will have to develop a feel or skill for when to do this.

In an optional embodiment, this example game may be played with multiple wager denominations without changing pay outs in the pay tables or game indicia inventory. This is distinguished from many of the other video games which either change the pay tables or adjust the symbol mapping hit frequency (by adding or subtracting stops), to keep the casino daily hold amount about the same for all the denominations of play on a specific game. The bet spread limit on any round or game is between one and five credit units of a specified denomination. This optional embodiment permits varying sized wagers on each round or game, with the wager spread controlled by requiring the players to manually restore the cage inventory before changing wager denomination.

In this optional example, play history is separately tracked for each wager denomination. In such an optional embodiment, the history for any particular wager denomination is tracked since the exclusion of dealt game indicia makes each game unique. Thus, in an optional embodiment of such a gaming machine, having five or six wager denominations, the play history is separately tracked for each of five or six, respectively, wager denominations. While the information tracked may vary, in this optional embodiment, information such as the game indicia dealt, amount bet, amount paid out (if any), time, and date are tracked. Also, the amount of information tracked may vary, but in an optional embodiment, because a depletion game plays multiple game hands from a continually depleted inventory of game indicia, a record may be kept on the number of each game played from a full inventory (round 1, 2 etc.), thereby tracking the actual depletion of the inventory. This is distinguished from other video games, none of which plays more than one game, hand or round from a full inventory of indicia.

In an alternate optional embodiment directed to live play, a wire cage or blower contains five times the amount of inventory or three hundred fifteen balls that are selected nine at a time for up to six players at a specialized table. Up to five game hands are played before the cage is automatically restored. Pay outs may remain the same as electronic version. In this multi-player optional embodiment, the manual "Restore" button is passed from player to player each time the cage is restored.

Slot Machine Games

In another optional embodiment the depletion occurs in a video slot format. In a typical video or reel slot machine the symbols on the reels are not the actual stops. In such a typical machine, there may be anywhere from twenty-one to twenty-four symbols and blank spaces shown on each reel but there are actually anywhere from 220 to 370 stops for each reel that is mapped to the reel symbols. For a typical slot machine with twenty-two reel symbols/blank stops on each reel, this equates to over 10,000,000 possible combinations.

In this optional embodiment, the actual number of symbol stops are displayed for the reels in each of the reel inventory storage areas. The game initiates just like a slot machine and stops each reel wherever the random number generator instructs it to after the number has been selected.

However, in accordance with some embodiments of the present invention, after each game hand, the displayed combination of symbols and/or blanks may be excluded from that reel's inventory for subsequent game hands. Thus, after the first game hand in which, for example, 220 stops on each reel were available, only 219 stops on each reel are available on a second game hand. The depletion reduces the total combinations possible each time a stop is removed thus increasing the probability for a player to hit a jackpot. As above, this optional embodiment includes an automatic restoration event such that a certain amount of stops will always be left in the inventory when the automatic restoration of the excluded game indicia, i.e. reel stops, occurs. Also, a manual restoration event such as a "Reload" button will allow a player to control the early restoration of the game indicia.

Poker-Type Games

Various embodiments may be applied to a poker-type game. For example, in one optional embodiment in which the base game is a standard Jacks or better video draw poker game, up to four game hands are dealt from a standard fifty-two card poker deck before an automatic restoration event. As known in the art, the player of such an optional embodiment plays to obtain a winning hand as listed on a pay table. Play starts when a player selects the wager denomination for betting and places a bet of between minimum and maximum credits for the first hand. When the deal button is pressed, a game hand, five cards in this optional embodiment, are dealt face up to the player. The player has the option to keep any or all of the cards by pushing the hold button under each card and drawing up to five cards to replace the discarded ones. The replacement cards are dealt from the deck depleted of the five initially dealt cards. The game hand, consisting of the held cards along with the replacement cards, has been completed at this point. If a player receives a winning hand, the player is rewarded according to a pay table.

In this optional embodiment, in playing the additional hands from the depleted deck, each game hand wager is between a minimum and maximum bet limit for the selected wager denomination. In this optional embodiment, to change the bet credit denomination, the deck must be restored to a full inventory. In this optional embodiment, the pay table is constant throughout the additional game hands. That is, even in hands in which dealt game indicia are excluded, the pay table of this optional embodiment does not change. In an optional embodiment, the pay table could be:

| Hand Combination | Payout |
| --- | --- |
| Royal Flush | 5,000 |
| Straight Flush | 500 |
| 4 of a Kind | 200 |
| Full House | 50 |
| Flush | 35 |
| Straight | 30 |
| 3 of a Kind | 10 |
| 2 Pair | 5 |
| Jack's or Better | 5 |

In this example embodiment, as each card is dealt out to form an initial playing hand, it is deleted or otherwise excluded from the deck inventory for subsequent play until a restoration event. According to some embodiments, each card in a standard poker deck is a separate symbol, having an attribute of one of four different suits (spades, diamonds, clubs and hearts) of one of thirteen different values. Thus, for example, there is only one Queen of hearts in a deck, but there are a total of four Queens in the same deck. If the Queen of hearts were dealt in the first hand after a restoration event, it would be impossible to obtain a heart Royal Flush or four-of-a-kind Queens in a subsequent hand because that Queen of hearts is now excluded from subsequent play until the deck is restored. All of the listed payout combinations are possible to obtain from a full deck, i.e. complete finite set, but if more than one hand is played, each card symbol is deleted from the deck inventory for future use until a restoration event. As above, card depletion from the deck may not only reduces the total inventory but, in an optional embodiment using a single deck with no duplicates, each separate card symbol goes to zero balance and may not available to be dealt to subsequent game hands until a restoration event.

In some embodiments, as discussed above, a manual restoration event can be triggered by the player. The "Reshuffle" button allows players to be in control of playing with a depleted inventory, and it becomes a player option on whether to restore the excluded game indicia after playing one, two, three, or four hands before, in this optional embodiment, the deck is automatically restored. It allows an individual the ability to play the game with any strategy of choice and places the burden of playing with depleted outcomes on the individual and not on the game. A skill factor of knowing when the optimum time in the deck penetration is to call for an early reshuffle may be used in this game unlike some other game. In an example embodiment for draw poker, proper use of this game function will add approximately ½ of a percent to the Expected Value Payout to players over a period of time. The optimal play strategy of reshuffling at the precise time relative to the possible remaining pay outs may not be apparent, and each player may develop a feel or skill of when to do this. Player error may be high in this area.

In some embodiments, there may be a difference between the "Reshuffle" button function and the automatic restoration of the deck inventory. In an optional embodiment directed to draw poker, the automatic restoration event could be optionally determined by the quantity of completed hands. In an optional embodiment drawn to stud poker games, the automatic restoration could be optionally determined by the quantity of hands conducted or the quantity of cards dealt.

In some embodiments, as discussed above, as each card symbol is played, it may be removed from the deck inventory and displayed to the player. As noted, in an optional embodiment using a single poker deck, each card is a separate individual symbol. Thus, as each card is played there may be a zero balance for the symbol in the remaining deck inventory. When a symbol or combination of symbols that can form a winning combination of a listed payout is deleted from the deck prior to the start of a new hand, a player of this optional embodiment is notified through the display so that the player can opt to restore or reshuffle the deck inventory. For example, the player of such an optional embodiment would be notified through the display of any winning hand, such as a Royal Flush or a pair of Jacks, that may be eliminated as a result of deck depletion. In this optional embodiment, the player is also informed through the display of the remaining deck inventory after at least one hand has been played.

In an optional embodiment of a multi-denomination version of such a poker-type game, the winning hands listed on the pay table are constant without regard to the wager denomination. This is unlike some other video poker games in which the pay tables change when a game is played with a low denomination wager to keep the average daily casino hold about the same for all denomination machines.

In an optional embodiment, a player may wager between the minimum wager up to five times the minimum wager in any wager denomination level. As above, if a player wants to change the wager denomination, the deck must be restored to a full inventory of cards. Play history may optionally be separately tracked for each wager denomination. As above, the recording history of a such an optional embodiment may include such information as a game hand number, i.e. an identification of the game hand in the series of game hands after a restoration event, and cards played, win, lose, bet amount, and the like for each game hand.

According to the optional embodiment described, the game is distinguished from known poker-type games in that a player may (1) play a hand in a way that will give the highest expected value considering the average weighted payout for all possible outcomes; (2) exercise the choice and control of when to reshuffle the depleted deck considering the possible remaining winning hands; and (3) adjust wagers and wager denomination to obtain optimal pay outs as the deck is depleted.

In yet another optional embodiment, a 4th hand bonus may be provided for the draw poker-type game described. That is, this optional embodiment is provided as a modification of the Jacks or better draw poker game. As above, the deck is automatically restored after four complete hands dealt from a single deck of fifty-two cards. According to the optional embodiment, a bonus payout occurs for certain holdings, such as a Royal Flush or a Straight Flush, that occur on the fourth game hand after a deck is restored and reordered. An example pay table could be:

| Combinations | Payout for Hands 1-3 | Payout for Hand 4 |
| --- | --- | --- |
| Royal Flush | 4,000 | 8,000 |
| Straight Flush | 500 | 1,000 |
| 4 of a Kind | 200 | 200 |
| Full House | 45 | 45 |
| Flush | 35 | 35 |
| Straight | 25 | 25 |
| 3 of a Kind | 10 | 10 |
| 2 Pair | 5 | 5 |
| Jack's or Better | 5 | 5 |

Again, this optional embodiment may be distinguished from other games in that a bonus may be offered on a hand dealt from a depleted deck of cards in which there is a higher likelihood of obtaining a straight flush. Thus, the player must factor in the possibility of winning the bonus amount in formulating the player's strategy of manually restoring the deck.

In another optional embodiment directed to a stud poker-type game, a Joker card that can substitute for any other card, i.e. a wild card, is added to a conventional fifty-two card poker deck to give a finite set containing fifty-three cards. In this optional embodiment, up to ten complete game hands could be conducted before an automatic restoration event to replenishing the deck inventory of cards.

In the optional embodiment, a wager is placed and a game hand is played with five cards dealt out to the player, with four cards face up and one card face down. In such an optional embodiment, a player has the option to double his or her wager based upon deck depletion and the remaining cards. The final card is revealed and the player is rewarded according to a pay table if the game hand is a winning hand.

In some embodiments, as described above, a player may have the ability to trigger a manual restoration event to restore excluded game indicia and reorder the deck inventory anytime after a hand of play is completed.

This may distinguish the example embodiment from other stud poker-type games in that the player may develop a strategy to reshuffle the deck to obtain the most winning pay outs of optimal estimated value. For example, it is noted that in a single player, single deck optional embodiment of the present game, by reshuffling the deck after a Joker has been played, the joker (wild card) will tend to appear 3½ times more often than if the deck was not reshuffled and the deck not depleted past one hand of play. Player error may occur both in the proper time to double the bet and optimal time to reshuffle the deck early.

In another optional embodiment, this game may include a bonus payout for certain winning hands appearing in certain game hands after a restoration event. For example, in an optional embodiment, a double payout for a Royal Flush and Straight Flush may be provided if the game hand is acquired in the 7th or 8th game hand after a deck is restored. In this optional embodiment, an automatic restoration event may occur after eight game hands before there is an automatic restoration of the deck inventory. The bonus pay outs could affect the strategy for early reshuffling and the dependence of the wild card play.

In another optional embodiment a method could be applied to a multi-hand draw poker-type game. For example, in one optional embodiment that utilizes one deck of fifty-two poker playing cards, four game hands of five cards each are dealt out to the player after the wager denomination is selected and a wager is placed. Unlike other multi-hand poker games that merely duplicate the same hand, the game hands according to this optional embodiment are dealt simultaneously, rather than sequentially, and completed from a continually depleted deck. That is, in this optional embodiment, the player makes a hold selection on each of the four game hands and draws from the remaining cards in the deck to complete each game hand in rotation.

In this optional embodiment, all the game hands played are displayed as the other game hands are completed, so an additional display of the deck inventory may not be necessary. In this optional embodiment, the multiple game hands are dealt simultaneously, and the deck may be restored after each game of multiple hands. Thus, a player cannot reshuffle the deck or increase the bet as each game hand is completed.

In yet another optional multi-hand embodiment, four game hands of five cards each may be dealt simultaneously to a single player from a standard fifty-two card poker deck. Each game hand may have a bet limit determined by a minimum and maximum wager and may optionally require that a bet of at least one credit be placed on each of the four game hands before the deal. As above, the player's goal is to obtain winning hands based on a schedule of winning hands in a pay table.

In some embodiments, after the initial four game hands are dealt out, the player can select to hold any or all of the cards and draw to replace the discarded cards from the depleted deck inventory. Game hands must be played in rotation order from the first through the fourth hand. Since each game hand could require at most ten cards, only a maximum of forty cards would be depleted from the deck. If a player obtains a winning combination on any completed game hand, he or she is paid according to a pay table.

This optional embodiment may be distinguished from other video games by the application of the present method of dealing multiple hands, each requiring a separate wager, from a continuously depleted deck. Additionally, however, the optional embodiment may include a multi-hand pay table to take advantage of the present multi-hand method. An example of a pay table according to this optional embodiment could be:

| Combinations | Payout |
| --- | --- |
| 4 Royals on the deal | 1,000,000 credits |
| 4 Royals - any way | 100,000 credits |
| 3 Royals - any way | 50,000 credits |
| 2 Royals - any way | 20,000 credits |
| 1 - Royal Flush | 5,000 credits |
| 1 - Straight Flush | 500 credits |
| 1 - Four of Kind | 200 credits |
| 1 - Full House | 45 credits |
| 1 - Flush | 30 credits |
| 1 - Straight | 25 credits |
| 1 - Three of a Kind | 10 credits |
| 1 - Two Pair | 5 credits |
| 1 - Jacks or Better | 5 credits |

This optional embodiment may not contain the ability for the player to manually trigger a restoration. Rather, excluded game indicia may be restored after the four simultaneously dealt game hands are completed. Optionally, a progressive linked bonus payout system may be implemented for this game.

In this optional embodiment, a display is included to inform a player of the game indicia or winning combinations that have been depleted to zero and, thus, are not available for play for each subsequent hand before the deck is restored to a full card inventory.

Blackjack-Type Games

Some embodiments may also be applied to Blackjack or Blackjack-type games. In an optional single player embodiment, one or more hands are played against a dealer's hand with the object being to obtain a player hand, the total of which is nearer to twenty-one than the dealer's hand total is, without exceeding twenty-one. As known in the art, in the present optional embodiment, the Aces count as either one or eleven, face cards (kings, queens and jacks) as ten, and the numbered cards as their face value.

In some embodiments, two cards are dealt face up to the player and two cards are dealt to the dealer, one face up and one face down, commonly known as the hole card. The dealer's hole card is displayed after the player completes the player's game hand. However, if the dealer's hand is a natural twenty-one, i.e. an ace and a ten-value card also known as Blackjack, in a version of the game that does not have the insurance option, then both cards of the dealer are displayed and the game hand is over. Conversely, if a player's first two cards are a natural twenty-one, or Blackjack, the player is typically paid greater than even money assuming the dealer does not also have a Blackjack. The precise award for a Blackjack could vary.

In some embodiments, if, after completing the game hand by hitting or standing, the total value of the player's game hand is closer to twenty-one than the dealer's hand, then the player will win and be paid, optionally at even money. Additional options, such as splitting and doubling down may also be made available to the player. If a player's cards total more than twenty-one, the player busts and the player loses the wager bet. If the player and dealer have the same hand totals of seventeen or more a push occurs and bets are returned.

In this optional embodiment, one or more fifty-two card standard poker decks may be used. In an optional embodiment, as many as eight decks or more may be used. In some embodiments as discussed above, multiple hands are played from the deck and dealt cards are excluded from further play until a restoration event. It should be recognized that other embodiments may not include finite decks, may not include such depletion, and/or may include any other methods.

In some embodiments, as each game indicia, i.e. playing card, is dealt to either a player hand or a dealer hand, it is displayed to the player and removed from the deck inventory. That is, each card in a conventional poker deck is a separate symbol and as each symbol is played there is a balance of zero for that symbol in the deck inventory. When a symbol or combination of symbols that can form a winning combination for a listed payout is not available as a consequence of the exclusion of dealt cards, a display notifies the player. Optionally, the player may manually restore or reshuffle the deck inventory if the player chooses to do so. For example, if, as a result of the depletion, the Blackjack combination is eliminated, a display is provided to the player.

In some embodiments, the player has the ability to manually trigger an early reshuffle of the deck inventory after any completed hand by utilizing the "Reshuffle" button function of the game. The example game may also be directed for use in a multi-player format. In such an embodiment, any player may be able to manually trigger a restoration or, in an optional embodiment, the ability to manually trigger a restoration may rotate among players.

In some embodiments, as discussed above, limits on the bet spread (i.e. the difference between the minimum and maximum wager) and the ability of the player to change wager denomination may apply. That is, in an optional embodiment, the player may be restricted from changing wager denomination except after excluded indicia are restored either manually or automatically.

In an optional embodiment, each player may play multiple game hands dealt simultaneously. That is, in such an optional embodiment, two or more hands are dealt to the player and one hand to the dealer.

In some embodiments, while the player may be required to complete the player's game hands in a particular sequence, in an optional embodiment, the player may select the order in which the hands are played. Thus, one strategy would be to use the display of the excluded cards, or alternatively the cards not excluded, the player may play the game hands in the order that optimizes the player's chance of obtaining a particular card. As above, a Blackjack is an automatic win for the player unless the dealer also has a blackjack hand. All hands lose if dealer has a Blackjack, except that if the player has one or more Blackjacks a push outcome may occur.

In some embodiments, as discussed above, cards may be dealt from the continuously depleted deck until an automatic restoration event or manual restoration event, whichever occurs first. In this optional embodiment, an automatic restoration occurs when a quantity of cards have been dealt. Additionally, the player may also manually trigger a restoration after the dealer hand is completed. It should be recognized that other embodiments may not include such finite sets, such depletion, and/or may include any other methods.

In a further optional embodiment, a bonus may be provided for occurrences over multiple game hands. For example, in one optional embodiment, three game hands may be dealt to the player and one hand to the dealer. In this optional embodiment, the player receives a bonus payout for multiple Blackjacks, such as three Blackjacks for the three simultaneously dealt player game hands. In another optional embodiment, a player may be dealt four game hands and a bonus may be provide for multiple Blackjacks, such as two, three, or four Blackjacks, in the four simultaneously dealt player game hands.

It is specifically noted that embodiments of the present invention is not limited to video gaming machine and computer, e.g. Internet, play. Rather, embodiments of the present invention may be applied to table games as well. According to an optional embodiment, a table version of the present invention may include an object placed in front of only one player on any game hand to represent a "Reshuffle" button. This "Reshuffle" button would allow only one player to manually trigger a restoration before an automatic restoration. Optionally, the "Reshuffle" button rotates each time the deck is restored, either manually or automatically.

It is further noted that in some embodiments, the quantity of-cards played before an automatic restoration can be significant. By utilizing a consistent automatic restoration point, a payout of any blackjack type game will have less risk that the house advantage will be too low or that the player will gain an advantage. For example, in a game using six-decks of playing cards, the automatic restoration point set at seventy-eight cards remaining gives an average casino hold of 2.42% over the long term. However, by setting the automatic restoration point at seventy-nine cards remaining, the average casino hold raises to 2.53% over the long term.

Thus, by controlling the automatic restoration point in some embodiments, along with the minimum and maximum wager spread and any limitations on changing wager denomination if desired, a Blackjack-type game can be created applying various embodiments that does not allow the player to have an advantage over the house. Thus, in an optional embodiment, the present invention includes the calculation of an automatic restoration point to minimize the risk that the player will gain an advantage, or that the house will lose an advantage, over the long term including such factors as the size of the finite set. Some embodiments of the present invention further include using such a calculated automatic restoration point consistently such as by automatically restoring the game indicia in an electronic version, or by marking a shoe of playing cards to include a guide, e.g. a channel, groove or visual marker, to position mark a consistent automatic restoration position when the decks are restored.

In some embodiments, selecting a game indicia and/or card may include selecting a value for the card and a suit for the card. In some implementations, the value and suit may be selected separately. The value may include, for example, a face value (e.g., a two, a three, an ace, a king, a queen, etc.) The suit may include, for example, a heart, a spade, a diamond, or a club.

In some embodiments, a value may e selected with reference to an inventory of available game indicia/card or other card data. The value may be selected based on the available game indicia. For example, the value may be selected from the inventory depleted of values that have previously been selected. For example, an inventory may begin with 4 tens, but after a ten has been dealt, the inventory may have only 3 tens. Selecting a value may include using a random number generator to select a value from the remaining inventory of values, and/or any other method of selecting a value from a remaining inventory of values.

In some embodiments, the selected value, may correspond to a generic card without a suit. Unlike embodiments discussed above in which a selected card and/or indicia includes both a value and a suit, in this embodiments, the selected value does not include a suit.

In some embodiments, a suit may be selected from the four possible suits. Accordingly, in a deck, all cards of a value may have the same suit. In some implementations, a game played in this method may have outcomes that are not determined by a suit of a card. Such a game may include blackjack. The suit may be selected by a random number generator or any other method. The suit may be selected without reference to an inventory and/or card data. The suit may be selected separately from the value.

In some embodiments, the inventory or other information about card values remaining in an inventory may be displayed.

In some embodiments, after a value is selected, a number of indicia in an inventory that have the same value may be reduced and/or depleted to reflect the selection of the value. No specific card may be eliminated by such reduction in some examples, because the suit of the cards remaining is determined separately from the value. Accordingly, in some such embodiments, a deck may end up having multiple cards of the same suit even though a standard deck may not have such duplicates.

While certain embodiments of the present invention have been shown and described it is to be understood that the present invention is subject to many modifications and changes without departing from the spirit and scope of the claims presented herein.

In some embodiments, a player may not have an option to restore/reshuffle a deck. In such embodiments, at least one additional sequential game hand may be conducted using a finite set/deck data/inventory cumulatively excluding dealt game indicia until an automatic restoration event. Such an event may include, for example, a number of cards being dealt, a number of hands played, a particular state of a shoe, when a cut card is reached, and so on. In some implementations, a virtual card may be placed in a deck at a desired location and when the cut card is reached the deck may be reshuffled/restored. In some implementations, the reshuffle/restore may occur before the start of a next hand. In other implementations, the reshuffle/restore may occur at a time when the automatic event is triggered (e.g., even if it is in the middle of a hand). In some implementations, a cut card may be placed in a deck between a desired range of cards (e.g., in the middle third of a deck), at a random location in a deck, and/or in any other desired location and/or fashion.

Some embodiments may include saving a state of a finite set/deck data/an inventory. Such a state may be saved, for example after a first gaming session. Saving a state may include, for example, storing information describing a current circumstance of a deck, such information may be stored, for example, in a database, and/or on any computer readable medium. A gaming session, for example, may include any number of games played. A gaming session ay end, for example, when a player turns a device used to play the game off, leaves a gaming machine, turns a computer program used to play a device off, switches applications on a computer, visits a different website than the one used to play a game, and/or takes any other action to stop the play of a game.

Some embodiments may include restoring a state of a game at a start of a second gaming session. The start of a gaming session may include any time before play of a game begins (e.g., before cards are dealt, before a player is given an option to make a move in a game, etc.). Restoring a state may include receiving/retrieving stored information. Such information may be retrieved from a database and/or any computer readable medium. Be restoring the state, the player may begin play using a deck that has been depleted to the extent it was depleted in the prior session. Accordingly, a player may be unable to perform a manual restoration by turning a game off and back on, in some such implementations.

In some implementations, information about a state may be stored in a location that may withstand a reset of a gaming device, for example, a permanent storage device such as a hard disk drive. In some implementations, such information may be updated each time a card is dealt so that the information is up to date at all instances.

In some implementations, a first gaming session may take place on a first device and a second gaming device. Each gaming device may have access to the state information (e.g., through a communication network). The state information may be stored for example, on a networked drive or other network accessible storage medium. The state information may be stored on a card or other id that a player carries with her and may be used by the player to start a game (e.g., similar to the well known TITO system storage of money information). In some implementations, a player may end a computer program to end a session and begin a computer program at a same or different device to begin a second session. A computer program may include, for example a java script program, an AJAX program, a web browser, a web based application, a stand alone program, and/or any other program.

In some embodiments, an exclusion/depletion of dealt game indicia/cards such that at least one value of the game indicia/cards is eliminated may result in a restoration of game indicia/cards. For example, in some implementations, if an exclusion of a card from a deck results in no cards having the same value being available for a next hand, a restoration event may occur (e.g., card data may be restored, a deck may be reshuffled, etc.). In some implementations, the number of card values not being available for a next hand may be greater than one. For example, if dealing a hand results in no further 10's and no further 2's, a restoration of the cards may occur.

Some implementations may include determining if such an exclusion results from a depletion of deck data/inventory/a finite set. Such determination may include, for example, referencing a table of available outcomes and/or determining in any other way.

In some implementations, a plurality of values that are eliminated that lead to a restoration event may include all the cards dealt in a game hand. For example, for a game hand in which a 10, a 2, a 4, and a 6 are the only cards dealt, a restoration event may occur if after the dealing, there are no 10s, no 2s, no 4s, and no 6s remaining in the deck. In some implementations, this may be a rare occurrence.

In some embodiments, when an outcome becomes unavailable due to depletion, a display regarding an inventory/deck data may be hidden. For example, in some embodiments, if all outcomes are available based on the constituency of a deck, a display may show information about the constituency; however, if an outcome becomes unavailable due to depletion, the display may be hidden.

In some embodiments, hiding a information may include removing the information from a display (e.g., from a monitor, form a screen, etc.). In some embodiments, hiding information may include preventing the information from being displayed. In some implementations, such information may be displayed under some circumstances, but may be prevented from display under other circumstances.

In some implementations, the number of outcome eliminated based on depletion may be greater than one. For example, in some implementations, the number may include a number equal to all outcomes that are associated with cards dealt in a prior hand. For example, in some implementations, if a two, a king, an ace, and a ten are dealt in a prior hand, then the number may include all outcomes that include any other those cards (e.g., four kings, a straight with any of the cards, etc.).

In some implementations, this hiding of information may affect play by a player. However, such ply may be affected as a deck reaches an end when it is more likely that depletion will have such an effect. It may become easier for a player to track cards as a deck reaches an end than at the beginning of a deck. In some implementations, a player may be presented with a warning that a display of information is about to be hidden so that the player may begin to keep mental track of card/indicia information.

Embodiments Set B

U.S. patent application Ser. No. 09/977,138 entitled "Electronic Card Game and Method," filed Oct. 12, 2001, U.S. Provisional Application Ser. No. 60/241,644 entitled "Electronic Video Poker Game and Method," filed Oct. 19, 2000, U.S. patent application Ser. No. 09/942,520 entitled "Live And Electronic Wagering And Lottery Game," filed Aug. 29, 2001, U.S. Provisional Application Ser. No. 60/229,665 entitled "Live and Electronic Wagering and Lottery Game," filed Aug. 31, 2000, and U.S. patent application Ser. No. 11/007,108, entitled "Method of conducting a wagering game with continuous depletion," filed Dec. 7, 2004 are all hereby incorporated herein by reference.

Some embodiments of the present invention relate to a live and/or electronic wagering and/or lottery game. In some embodiments an inventory of game symbols are arranged in a random order and distributed to define an outcome for the game.

Wagering or casino or lottery games are typically referred to as live games or electronic games. Live games may include those such as Poker, Blackjack, Roulette and the like. Electronic games may include games such as Video Poker and electro-mechanical and video based slot machines. For electronic games, a player inputs a wager which can be money, tokens or fictitious credits. Operation of the device produces an outcome, which can be a winning or a losing outcome.

For Video Poker, virtual cards are dealt and the player, by holding and discarding cards, attempts to construct a winning hand combination. For each hand of play, the cards may be randomly selected from what may be deemed to be a full deck of cards (e.g., by a random number generator). That is, as hands are sequentially played, the virtual deck may not be depleted of the cards that have already been played. After each hand, the game may proceed as though it were being dealt from a freshly shuffled deck.

For slot machines, symbols may be randomly selected and presented along one or more pay lines. The combinations of symbols at an enabled pay line determines whether the player has obtained a winning or a losing outcome.

For live games such as Blackjack, cards may be dealt from a deck or from a shoe containing multiple decks to players. The players assemble a final hand of cards which is the outcome. In Blackjack the final hand is the sum of the values of the cards according to the well known rules of the game. As hands are dealt the deck or shoe is depleted to a point where the cards are reshuffled. Players can keep track of the cards played and thus know which cards remain in the deck or shoe. This may give them an advantage.

It should be recognized that any game may be implemented as a live and/or electronic game. It various embodiments, any game may be played according to various methods and using various apparatus.

Some embodiments may include a game which has the excitement of a slot machine as well as the anticipation accompanying the deal of cards. Some embodiments may include a game where the inventory of symbols is depleted as hands are played, like a deck of cards, until the inventory needs to be re-shuffled. Some embodiments may include an electronic game which permits the player to, after any hand, order re-shuffling of the symbol inventory. Some embodiments may include an electronic game where the remaining inventory of symbols for play can be displayed for the player to see.

Some embodiments of the present invention may include a method and device for a game which randomly arranges game symbols into a serial ordered inventory and displays the same in sequence to define one or more outcomes. In some embodiments, a display displays the constituency of the inventory as symbols are depleted from the inventory during play. In some embodiments, at a prompt by the player or at substantially a predetermined point of exhaustion of the inventory, the inventory is re-constituted and re-shuffled into a random serial order.

In some embodiments, a method includes configuring the game inventory indicia into a random, serial order. In some embodiments, a player makes wagers and plays each of a series of hands. In some embodiments, for each hand of play a predetermined number of game indicia are revealed to define an outcome, said indicia selected in order from the serially arranged inventory. In some embodiments, a method may further include displaying the constituency of the inventory depleted of said revealed indicia for each hand as well as issuing an award to a player obtaining one of a plurality of preselected winning indicia combinations.

In some embodiments, a device for playing a game may include a processor, said processor configured to include means for randomly arranging an inventory of game symbols or indicia into a serial order and a video display. In some embodiments, means may be provided for a player to make a wager and prompt play of the game. In some embodiments, the processor, in response to prompting of play, may be configured to select and display at said display a predetermined number of indicia selected in order from said arranged inventory to define an outcome. In some embodiments, the processor may be configured to compare said outcome to a schedule of winning outcomes stored in a data structure and to issue an award for a winning combination. In some embodiments, the processor may be configured to display the constituency of the remaining symbol inventory.

Figure 3:
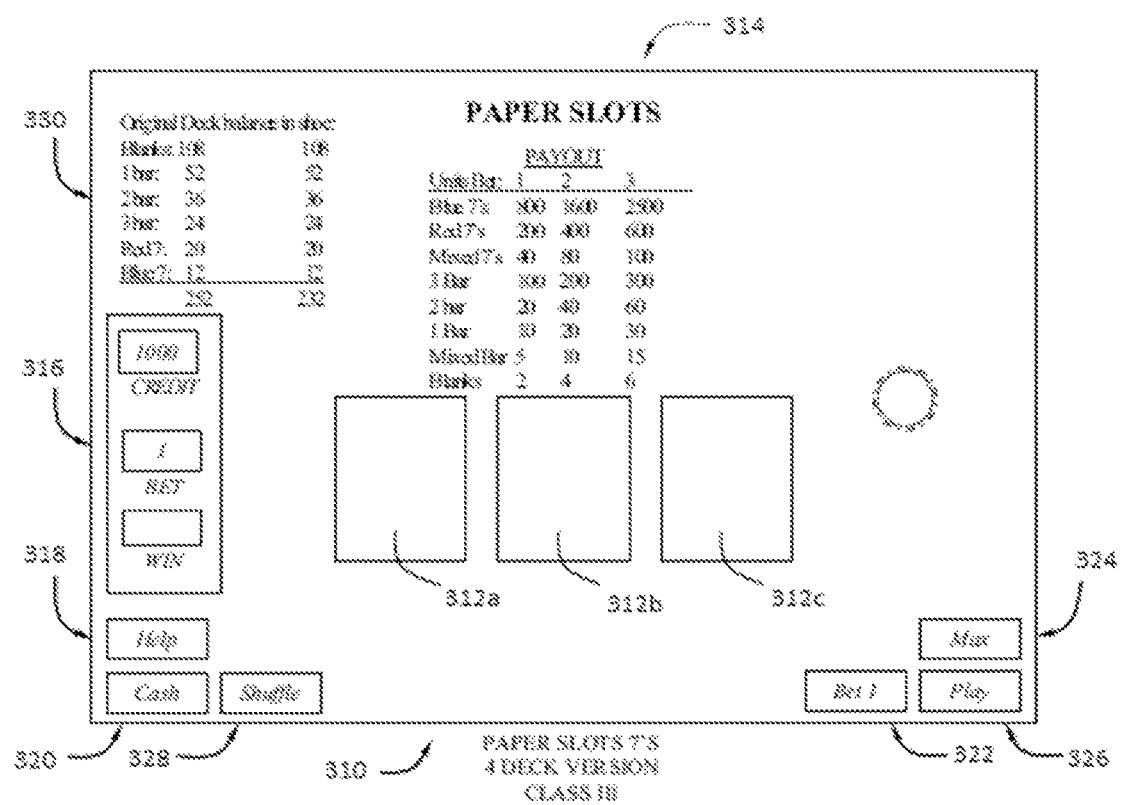
FIG. 3 shows a layout for a screen display for the electronic version before play.

Turning to FIG. 3, a layout 310 for the game according to the present invention is shown for play as displayed for the electronic version of a game according to some embodiments. According to this embodiment, the display includes three areas, 312a through 312c, which, as described below, receive game cards as dealt to produce an outcome for the game. The display may also show a pay schedule 314 as well as a credit meter 316 which reflects the number of credits are available for wagering, the amount wagered on a hand of play and the amount won. There also may be provided various buttons embodied as buttons on the machine or as areas on the display touch screen. These buttons include a help button 318 for the player to receive assistance concerning play, a cash out button 320 to cash out accumulated credits, a bet one credit button 322, max bet button 324 and play button 326. Also provided according to some embodiments of the present invention may be a shuffle button 328 the purposes of which will hereinafter become evident.

In some embodiments, to play a device, the player makes a wager by inserting coins or tokens or by depressing the bet one credit button 322 or max bet button 324. The placing of a maximum bet will automatically prompt play of the hand, otherwise the player may depress the play button 326 to start play. Upon the start of play, the processor for the machine, from stored data representing an ordered deck or inventory of game cards, selects and displays three cards in areas 312a through 312c. In some embodiments, the game includes cards. Certain game cards are as illustrated in FIGS. 5A through 5D. In some embodiments, a virtual deck includes sixty three game cards according to the following distribution:

TABLE-US-00001

Distribution of Game Cards

| Symbol | Number in deck |
| --- | --- |
| "BAR" | 15 |
| "BAR-BAR" | 9 |
| "BAR-BAR-BAR" | 7 |
| Red "7" | 5 |
| Blue "7" | 3 |
| Blank | 24 |
| Total | 63 |

The three cards as selected and displayed represent the outcome for the game. The player wins a payback based preferably based upon the following pay schedule in some embodiments.

TABLE-US-00002

Pay Schedule

| Units Bet | 1 | 2 | 3 |
| --- | --- | --- | --- |
| 3 Blue 7s | 2000 | 4000 | 6000 |
| 3 Red 7s | 300 | 600 | 900 |
| Mixed 7s | 50 | 100 | 150 |
| 3 BAR-BAR-BAR | 50 | 100 | 150 |
| 3 BAR-BAR | 20 | 40 | 60 |
| 3 BAR | 10 | 20 | 30 |
| Mixed BARs | 5 | 10 | 15 |
| 3 Blanks | 1 | 2 | 3 |

Other pay schedules, symbols and distributions of symbols can be adopted.

Figure 4:
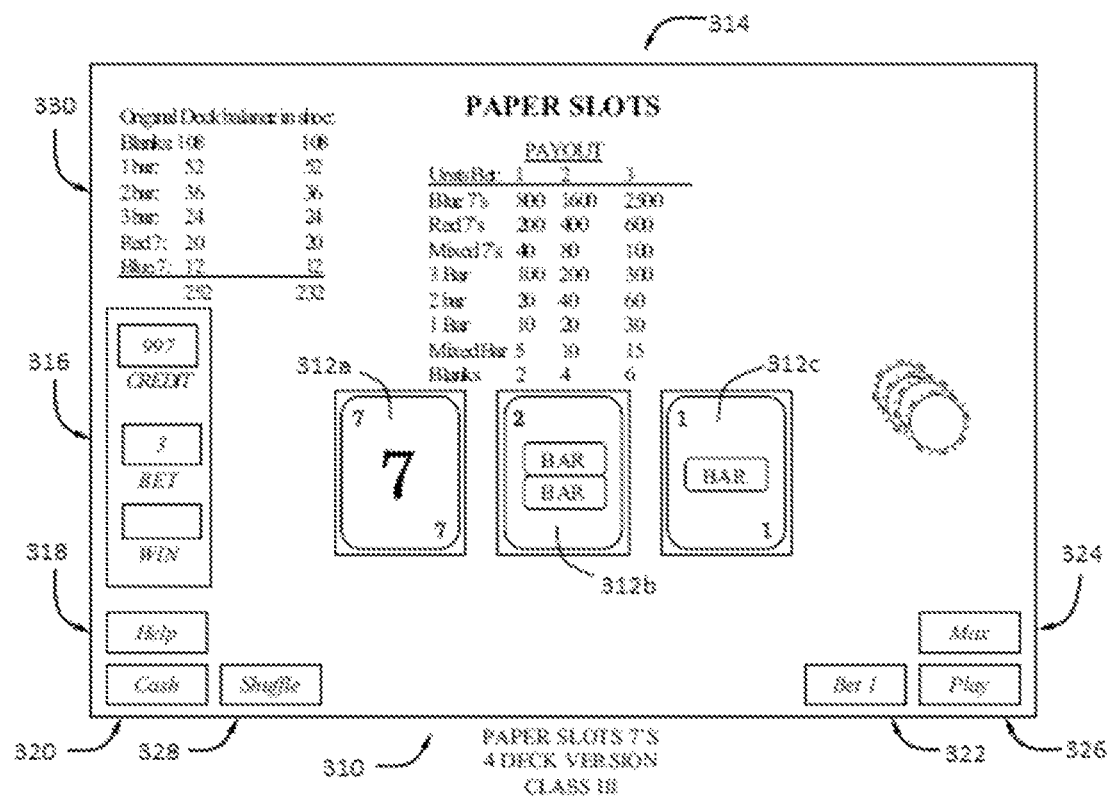
FIG. 4 shows a layout for the screen display for the electronic version after the deal of cards.
Figure 5A:
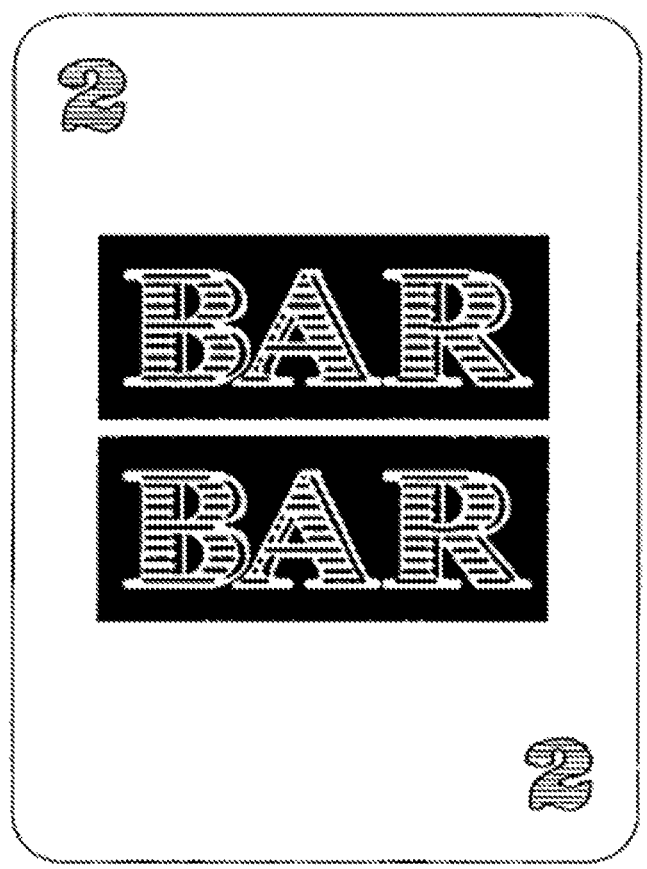
FIGS. 5A through 5D show representations of symbols which may be used for play of the game.
Figure 5B:
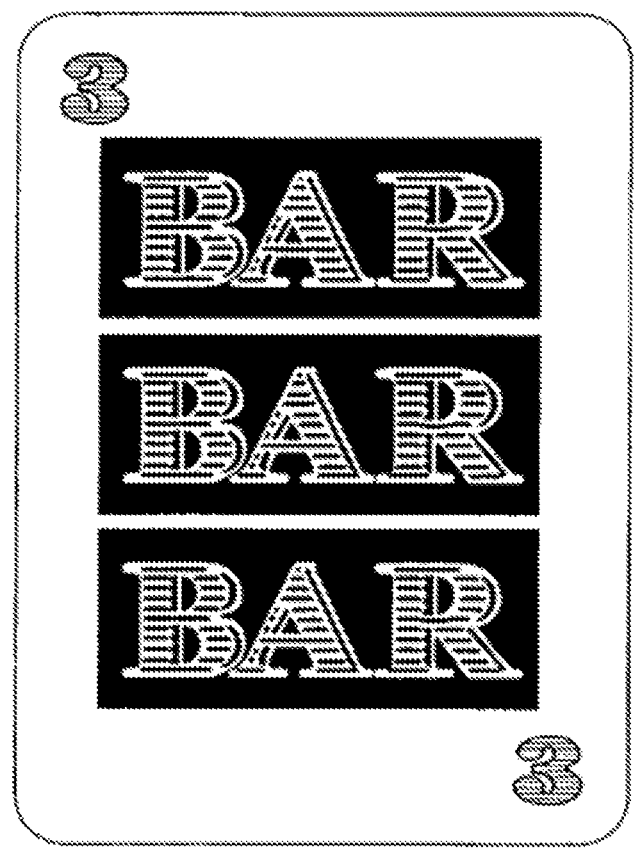
Figure 5C:
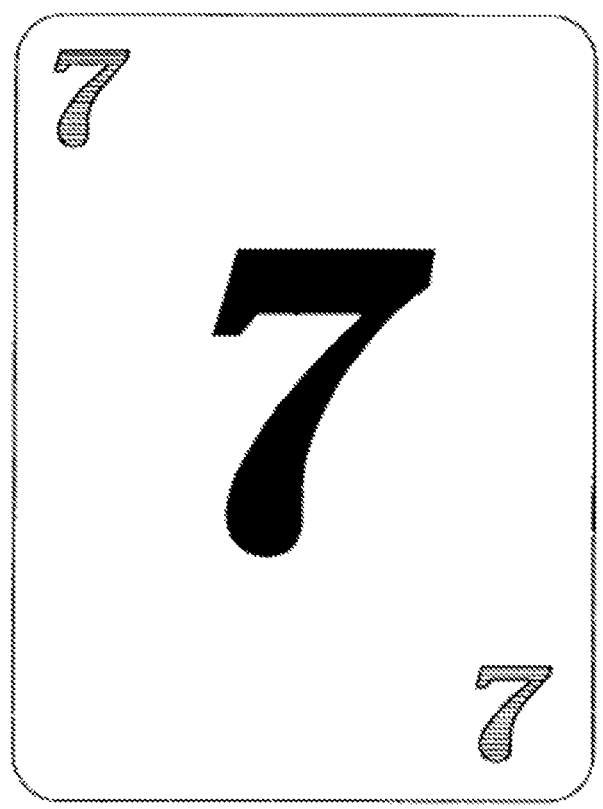
Figure 5D:
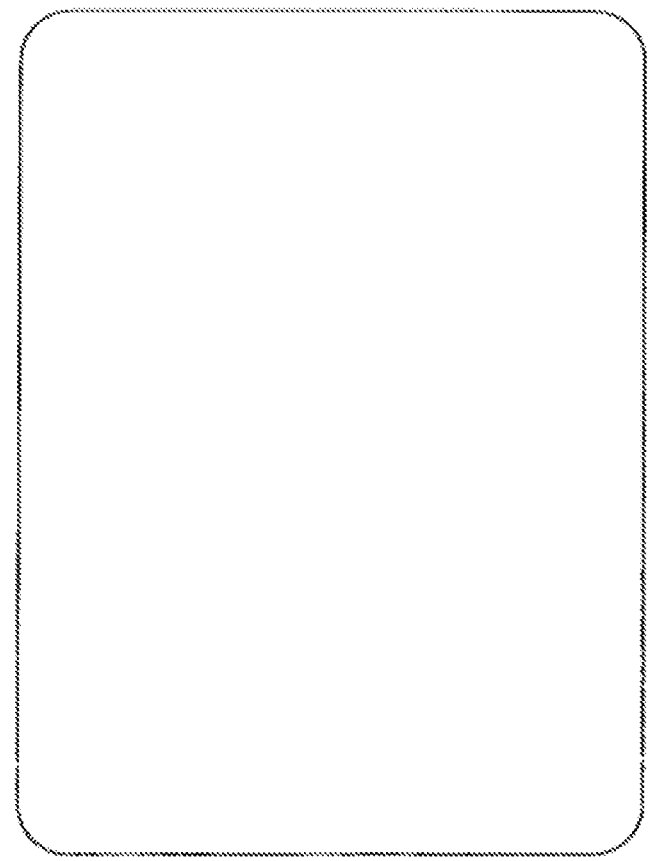

As shown in FIG. 4, the player has not obtained a winning combination since the combination is "7", "BAR-BAR" and "BAR". Thus the player would lose their wager.

In some embodiments, to play the next hand, the player inputs another wager and prompts play whereupon the processor would select and display the next three symbols in the ordered data structure representing the deck of game cards.

Some embodiments may include a data structure of game cards that may be stored in serial order as determined by a virtual shuffle of game cards. For example, the processor for the game may randomly arrange the cards in a serial order 1 through X, where, for the game described herein, X equals 63. In some embodiments, as hands are played one after another, the game cards are selected and displayed in the serial order in which they are positioned in the deck. For example, for the first hand cards in positions 1 through 3 would be displayed and removed from the arranged deck. For example, for the next hand the cards would be selected from positions 4 through 6 and so forth until the deck is depleted or reaches a predetermined location in the arrangement proximate the last sequential card. In some such embodiments, the serial play of hands thus depletes the virtual deck of cards in serial order as cards are selected. In some embodiments, when the deck is depleted to, for example, three remaining game cards, the processor reshuffles the deck and places the cards in a new, random serial order. By random serial order in this embodiments, what is meant is that, like an actual deck, the cards would be randomized and placed in sequence, 1 through X. In other embodiments, such random serialization, reshuffling, reordering, and/or finite decks may not be used and/or any other methods and/or elements may be used.

A feature of some embodiments of the present invention is that prior to entering a wager, the player can depress the help button 318 which controls the game processor to display a deck balance area 330 the constituency of the cards remaining in the deck. For example, if forty cards have been dealt for preceding hands, the balance area would display, for the remaining twenty-three cards, how many Blanks, BARs, BAR-BARs, and 7s remain in the deck. If, for example, all of the Blue 7s have been played thus depriving the player of the ability to have a 3 Blue 7s outcome, the player can depress the shuffle button 28 and the processor will reshuffle and randomize the deck. The ability to see the balance of the deck remaining for play may lead the player to increase their wagers based upon the perception that the probabilities for obtaining a favorable outcome are increased. Further, the ability to reshuffle in some embodiments may also convince the player that the game is fair.

In some embodiments, a game can be played with a single virtual deck or multiple virtual decks. Further the game may be played as a video lottery where it is guaranteed that in any particular cycle of hands, that each series of prizes will be awarded. For example, if the cycle is selected as 238,266 hands, the pay outs and frequencies are as set forth below:

TABLE-US-00003

238,266 Hands in Cycle

| Symbols | Hits | Payout | Max Bet Total Payout |
|---|---|---|---|
| Blue 7s | 6 | 6000 | 36,000 |
| Red 7s | 60 | 900 | 54,000 |
| Mixed 7s | 270 | 150 | 40,500 |
| BAR-BAR-BAR | 210 | 150 | 31,500 |
| BAR-BAR | 504 | 60 | 30,240 |
| BAR | 2730 | 30 | 81,900 |
| Mixed BARs | 23,536 | 15 | 352,890 |
| Blanks | 12,144 | 3 | 36,432 |
| | 39,450 | | 663,462 |

Total Play: 714,748
Total Payout: −663,462
Total Hold 51,336 (7.18%)
Hit Ratio: 1 in 6.04 hands Thus, it is seen that for some embodiments of a lottery based game, the game presents a 7.18% hold. This hold can be increased or decreased by altering the pays for one or more winning combinations or by adding more, or deleting, winning combinations.

In some embodiments, for a table game version, a table is provided much like a Blackjack table having, for example, six player positions. At each player position there may be provided the areas 312a through 312c for the players game cards. Each player may make a wager, the minimums and maximums of which may be dictated by house rules. After each player has made their desired wager, a dealer from a single deck of shuffled game cards or a shoe containing multiple, e.g. four, shuffled decks, may deal three game cards to each of the player's areas 312a through 312c. Depending upon the combination of cards, as discussed above, the player wins or loses. After paying each winning player and collecting losing wagers, the players make new wagers and new hands are dealt.

In some embodiments, before the start of dealing from a newly shuffled deck the dealer may discard, i.e. burn, three cards. Alternatively, the dealer may deal until there are three cards left in the deck, and then reshuffle. In some embodiments, dealing from the deck or shoe continues until reshuffling is warranted by there being insufficient cards left in the deck to deal hands of three cards to each player.

In some embodiments of an electronic version of the game, the players have the benefit of having displayed the deck balance and ordering reshuffling.

Figure 6:
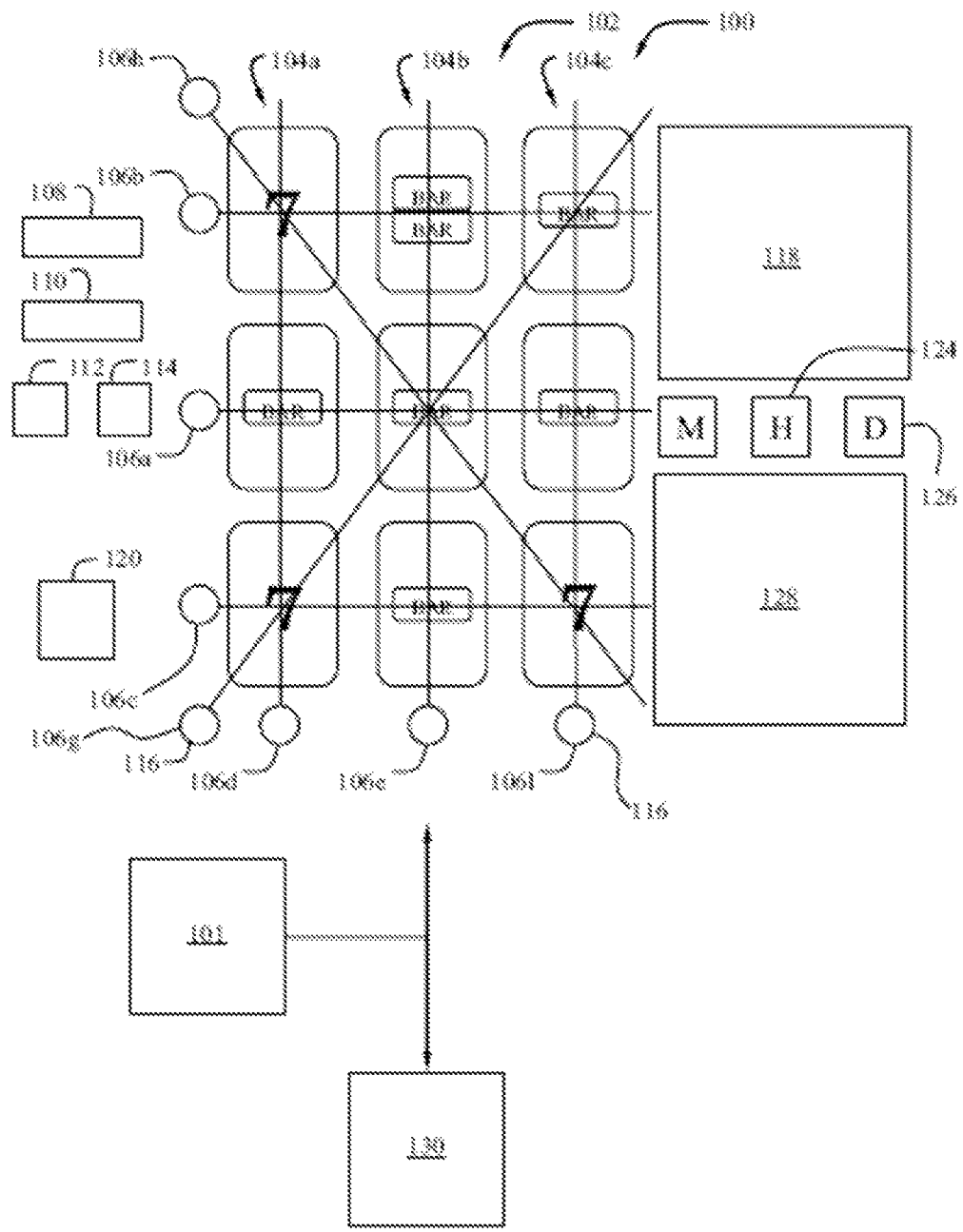
FIG. 6 shows a display for another version of the electronic game.

FIG. 6 illustrates a further example version of an electronic game. In FIG. 6 there is shown and electronic game display 100 controlled by a computer processor 101 to define a three-by-three matrix 102 in the form of a three reel slot machine. Thus the matrix 102 shows three reels 104a through 104c each having three rows for the display of selected game symbols. The matrix 102 also defines a plurality of pay lines 106a through 106h, shown as eight which embrace the horizontal rows, the vertical columns formed by the reels 104a through 104c, and the diagonals. As hereinafter described, game indicia are displayed in the matrix 102 to define outcome for each pay line 106a through 106h.

In this example embodiment, the processor also controls the display 100 to display other features for the game. At 108 the display 100 shows the total win for the game or spin whereas at 110 the total amount of credits for gaming are displayed. The total wagered for the last game played is displayed at 112. For a current game, before the spin, the total game wager is displayed at 114.

In this example embodiment, in regards to game wagers, each pay line 106a through 106h includes a banner 116 to indicate the amount being wagered on each corresponding pay line 106a through 106h. For example, if the player wagers three per pay line, each banner 116 would show "3" and the total game wager would be displayed at 114 as "24" (3.times.8 pay lines).

The display 100 also, in this example embodiment of the present invention, displays at 118 the inventory of symbols remaining for play. For example, where there are 63 symbols, after the initial shuffle the inventory of display may display the following:

TABLE-US-00004

| Symbols | Remaining |
|---|---|
| Blue 7s | 3 |
| Red 7s | 5 |
| BAR-BAR-BAR | 7 |
| BAR-BAR | 9 |
| BAR | 15 |
| Blanks | 24 |
| Total | 63 |

In some embodiments, as hands or games are played, the inventory display 118 would be depleted based upon the depletion of the symbols from the serial inventory. For example, and with reference to FIG. 6, the inventory may be now shown to be the following (all 7s in FIG. 6 assumed to be Red 7s):

TABLE-US-00005

| Symbols | Remaining |
|---|---|
| Blue 7s | 3 |
| Red 7s | 2 |
| BAR-BAR-BAR | 7 |
| BAR-BAR | 8 |
| BAR | 10 |
| Blanks | 24 |

In some embodiments, as games are played the player can assess the constituency of the remaining inventory. This feature may alter the wagering decisions of the player, e.g. to increase or decrease the wagers. It should be recognized that some embodiments may not include serial inventories, such depletion of symbols, and/or any other elements.

In some embodiments, in the event the player is dissatisfied with the remaining constituency of the inventory, the player can order the inventory to be re-shuffled by, for example, touching a touch screen button 120. In some embodiments, for re-shuffling the inventory is returned to its full symbol inventory, e.g. 63 symbols, and the symbols are randomly shuffled and placed in serial order. In some embodiments, the inventory display 118 may show a reconstituted, full, inventory. It should be recognized that some embodiments may not include such reshuffling, such touch screen buttons, and/or any other elements.

In some embodiments, the display 100, which again may be a touch screen display, includes other features. At 122 a button is presented, the touching of which applies a maximum wager to the game, e.g. 24 units. The wager, as with all wagers, may deplete the credit inventory displayed at 110. A help button 124 controls the game processor to display game information to the player. Finally, at 126 there is a deal button 126 which prompts play of a hand.

In some embodiments, at 128 the display 100 shows a pay table for winning pay line combinations. The winning combinations would be preselected and stored in a data structure for the processor 101.

TABLE-US-00006

| | Pay Table | | |
|---|---|---|---|
| Wager | 1 | 2 | 3 |
| Blue 7s | 3000 | 6000 | 9000 |
| Red 7s | 300 | 600 | 900 |
| Any 7s | 50 | 100 | 150 |
| BAR-BAR-BAR | 50 | 100 | 150 |
| BAR-BAR | 20 | 40 | 60 |
| BAR | 10 | 20 | 30 |
| Any Bar | 5 | 10 | 15 |
| Blanks | 1 | 2 | 3 |

In some embodiments, to play the example game of FIG. 6, the player wagers on one or more pay lines 106*a* through 106*h*. For purposes of this description it shall be assumed that the player has depressed the maximum wager button 122 to wager 3 units on each pay line 106*a* through 106*h*. The processor is prompted to select nine symbols from the beginning of the serial, random inventory and displays the same in the rows and columns of the game matrix 102 as shown. Based upon the symbols selected and displayed the player has obtained certain winning outcomes as tabulated below (all 7s are Red 7s):

TABLE-US-00007

| Pay line | Award |
|---|---|
| 106a | 30 (Three "BARs") |
| 106e | 15 (Three Any "BARs") |
| Total win | 45 |

In some embodiments, the award is displayed at 108 and may be issued at 130 in the form of credits, tokens, printed ticket or as otherwise known in the art.

In some embodiments, the inventory display 118 may show the displayed symbols removed from the inventory as tabulated above. In some embodiments, the player would enter wagers to play the next game. In some embodiments, based upon the displayed inventory, the player may choose before any play to re-shuffle and re-constitute the inventory by touching the re-shuffle button 120. In some embodiments, for example, if all of the Red and Blues 7s have been depleted from the inventory, the player would re-shuffle so that the higher award pay outs would be possible.

According to a further embodiment, the game may include "Wild" symbols which are wild to complete any winning outcome. Further the game symbols may be representations of playing cards. In some embodiments, a displayed, fully constituted inventory would be, for example, as follows:

TABLE-US-00008

| Symbol | Number |
|---|---|
| Wild | 4 |
| Kings | 5 |
| Queens | 6 |
| Jacks | 8 |
| 10s | 10 |
| Blanks | 30 |
| Total | 63 |

Further the pay table for the example game may be as follows:

TABLE-US-00009

| | Pay Table | | |
|---|---|---|---|
| Wager | 1 | 2 | 3 |
| Wilds | 800 | 1500 | 2500 |
| Kings | 100 | 200 | 300 |
| Queens | 50 | 100 | 150 |
| Jacks | 20 | 40 | 60 |
| 10s | 10 | 20 | 30 |
| Blanks | 1 | 2 | 3 |

Thus the game may use any suitable symbols if desired. Further the game matrix 102 may be expanded to four, five or more reels and may include more or less pay lines.

In some embodiments, the game can also be played as a live game where the indicia are put on cards which are dealt to each player from the deck including the card distribution as set forth above. In some embodiments, each player makes a wager and is dealt three cards from the deck which define the outcome. In some embodiments, at a predetermined point of penetration into the deck, e.g. 5 rounds of play, the deck is reconstituted and re-shuffled. In some embodiments, the player based upon the known distribution of symbols, may also be permitted to order reconstituting and re-shuffling of the deck for the next hand.

In some embodiments, selecting a game indicia and/or card may include selecting a value for the card and a suit for the card. In some implementations, the value and suit may be selected separately. The value may include, for example, a face value (e.g., a two, a three, an ace, a king, a queen, etc.) The suit may include, for example, a heart, a spade, a diamond, or a club.

In some embodiments, a value may e selected with reference to an inventory of available game indicia/card or other card data. The value may be selected based on the available game indicia. For example, the value may be selected from the inventory depleted of values that have previously been selected. For example, an inventory may begin with 4 tens, but after a ten has been dealt, the inventory may have only 3 tens. Selecting a value may include using a random number generator to select a value from the remaining inventory of values, and/or any other method of selecting a value from a remaining inventory of values.

In some embodiments, the selected value, may correspond to a generic card without a suit. Unlike embodiments discussed above in which a selected card and/or indicia includes both a value and a suit, in this embodiments, the selected value does not include a suit.

In some embodiments, a suit may be selected from the four possible suits. Accordingly, in a deck, all cards of a value may have the same suit. In some implementations, a game played in this method may have outcomes that are not determined by a suit of a card. Such a game may include blackjack. The suit may be selected by a random number generator or any other method. The suit may be selected without reference to an inventory and/or card data. The suit may be selected separately from the value.

In some embodiments, the inventory or other information about card values remaining in an inventory may be displayed.

In some embodiments, after a value is selected, a number of indicia in an inventory that have the same value may be reduced and/or depleted to reflect the selection of the value. No specific card may be eliminated by such reduction in some examples, because the suit of the cards remaining is determined separately from the value. Accordingly, in some such embodiments, a deck may end up having multiple cards of the same suit even though a standard deck may not have such duplicates.

While certain embodiments of the present invention have been described, it should be understood that it is subject to many modifications and changes without departing from the spirit and scope of the appended claims.

In some embodiments, a player may not have an option to restore/reshuffle a deck. In such embodiments, at least one additional sequential game hand may be conducted using a finite set/deck data/inventory cumulatively excluding dealt game indicia until an automatic restoration event. Such an event may include, for example, a number of cards being dealt, a number of hands played, a particular state of a shoe, when a cut card is reached, and so on. In some implementations, a virtual card may be placed in a deck at a desired location and when the cut card is reached the deck may be reshuffled/restored. In some implementations, the reshuffle/restore may occur before the start of a next hand. In other implementations, the reshuffle/restore may occur at a time when the automatic event is triggered (e.g., even if it is in the middle of a hand). In some implementations, a cut card may be placed in a deck between a desired range of cards (e.g., in the middle third of a deck), at a random location in a deck, and/or in any other desired location and/or fashion.

Some embodiments may include saving a state of a finite set/deck data/an inventory. Such a state may be saved, for example after a first gaming session. Saving a state may include, for example, storing information describing a current circumstance of a deck, such information may be stored, for example, in a database, and/or on any computer readable medium. A gaming session, for example, may include any number of games played. A gaming session ay end, for example, when a player turns a device used to play the game off, leaves a gaming machine, turns a computer program used to play a device off, switches applications on a computer, visits a different website than the one used to play a game, and/or takes any other action to stop the play of a game.

Some embodiments may include restoring a state of a game at a start of a second gaming session. The start of a gaming session may include any time before play of a game begins (e.g., before cards are dealt, before a player is given an option to make a move in a game, etc.). Restoring a state may include receiving/retrieving stored information. Such information may be retrieved from a database and/or any computer readable medium. Be restoring the state, the player may begin play using a deck that has been depleted to the extent it was depleted in the prior session. Accordingly, a player may be unable to perform a manual restoration by turning a game off and back on, in some such implementations.

In some implementations, information about a state may be stored in a location that may withstand a reset of a gaming device, for example, a permanent storage device such as a hard disk drive. In some implementations, such information may be updated each time a card is dealt so that the information is up to date at all instances.

In some implementations, a first gaming session may take place on a first device and a second gaming device. Each gaming device may have access to the state information (e.g., through a communication network). The state information may be stored for example, on a networked drive or other network accessible storage medium. The state information may be stored on a card or other id that a player carries with her and may be used by the player to start a game (e.g., similar to the well known TITO system storage of money information). In some implementations, a player may end a computer program to end a session and begin a computer program at a same or different device to begin a second session. A computer program may include, for example a java script program, an AJAX program, a web browser, a web based application, a stand alone program, and/or any other program.

In some embodiments, an exclusion/depletion of dealt game indicia/cards such that at least one value of the game indicia/cards is eliminated may result in a restoration of game indicia/cards. For example, in some implementations, if an exclusion of a card from a deck results in no cards having the same value being available for a next hand, a restoration event may occur (e.g., card data may be restored, a deck may be reshuffled, etc.). In some implementations, the number of card values not being available for a next hand may be greater than one. For example, if dealing a hand results in no further 10's and no further 2's, a restoration of the cards may occur.

Some implementations may include determining if such an exclusion results from a depletion of deck data/inventory/a finite set. Such determination may include, for example, referencing a table of available outcomes and/or determining in any other way.

In some implementations, a plurality of values that are eliminated that lead to a restoration event may include all the cards dealt in a game hand. For example, for a game hand in which a 10, a 2, a 4, and a 6 are the only cards dealt, a restoration event may occur if after the dealing, there are no 10s, no 2s, no 4s, and no 6s remaining in the deck. In some implementations, this may be a rare occurrence.

In some embodiments, when an outcome becomes unavailable due to depletion, a display regarding an inventory/deck data may be hidden. For example, in some embodiments, if all outcomes are available based on the constituency of a deck, a display may show information about the constituency; however, if an outcome becomes unavailable due to depletion, the display may be hidden.

In some embodiments, hiding a information may include removing the information from a display (e.g., from a monitor, form a screen, etc.). In some embodiments, hiding information may include preventing the information from being displayed. In some implementations, such information may be displayed under some circumstances, but may be prevented from display under other circumstances.

In some implementations, the number of outcome eliminated based on depletion may be greater than one. For example, in some implementations, the number may include a number equal to all outcomes that are associated with cards dealt in a prior hand. For example, in some implementations, if a two, a king, an ace, and a ten are dealt in a prior hand, then the number may include all outcomes that include any other those cards (e.g., four kings, a straight with any of the cards, etc.).

In some implementations, this hiding of information may affect play by a player. However, such ply may be affected as a deck reaches an end when it is more likely that depletion will have such an effect. It may become easier for a player to track cards as a deck reaches an end than at the beginning of a deck. In some implementations, a player may be presented with a warning that a display of information is about to be hidden so that the player may begin to keep mental track of card/indicia information.

Embodiment Set C

U.S. patent application Ser. No. 09/977,138 entitled "Electronic Card Game and Method," filed Oct. 12, 2001, U.S. Provisional Application Ser. No. 60/241,644 entitled "Electronic Video Poker Game and Method," filed Oct. 19, 2000, U.S. patent application Ser. No. 09/942,520 entitled "Live And Electronic Wagering And Lottery Game," filed Aug. 29, 2001, U.S. Provisional Application Ser. No. 60/229,665 entitled "Live and Electronic Wagering and Lottery Game," filed Aug. 31, 2000, and U.S. patent application Ser. No. 11/007,108, entitled "Method of conducting a wagering game with continuous depletion," filed Dec. 7, 2004 are all hereby incorporated herein by reference.

Some embodiments of the present invention relate to methods and devices for playing electronic video Poker, Blackjack and other card games.

Video Poker is a well known game that may be played using an electronic device such as a computer with a display, a hand-held device or with a dedicated, video Poker gaming machine. In some implementations, the play of basic video Poker is the same whether it is played with a hand held, electronic novelty device, with a computer, through the Internet or with a dedicated gaming machine. Some of the following description is primarily directed to a dedicated, video Poker gaming or video lottery machine of the type found in casinos.

To play the game according to some embodiments, the player makes a wager by any suitable means such as by wagering credits, inserting tokens or the like. In some implementations, once the wager is made the machine is prompted for play whereupon the processor for machine randomly selects from data representing a deck of playing cards, data representing ten playing cards. In some implementations, this data may not be arranged in any order and typically is configured as a data string representing the cards of the deck in no particular order. In some implementations, this order is fixed when the data string is constructed; however the random selection from the string in some implementations makes the fixed order, at least to a degree, irrelevant. In some implementations, from this randomly selected data, five playing cards are displayed representing the initial holding and the data for the remaining ten cards is held in inventory. In some implementations, the player, using a touch screen on the game display or buttons on the machine, selects which cards to discard, if any, from the initial holding. In some implementations, the data representing the discarded cards is replaced with the inventoried data and the replacement cards are displayed. In some implementations, the final hand is (with or without replacement cards) is compared to a schedule of winning hands based on the ranking of hands of Poker. If the player has a winning final hand, they are paid based upon their wager. If they do not have a winning hand, their wager is lost. In some implementations, after determination of the outcome of the hand, the player makes another wager and plays the next hand according to the above.

In some embodiments, for each new hand of play, the initial hand is selected from data representing a full deck of cards. This deck may have the standard fifty-two cards or may include an additional, wild, Joker. In this regard, it is further known to provide games according to the above based upon a deuces wild, Joker's wild and Joker's and deuces wild format. In some implementations, the play of a hand does not deplete the deck data stored for the next hand. In some implementations, the device does not track nor display cards remaining in the deck since there is no deck depletion as hands are played. In some implementations, there is no means for the player to select to "reshuffle" or not reshuffle after a series of hand.

Video Blackjack is also a known game. According to this game, the player makes a wager and data representing a two card player hand and two card dealer hand are randomly selected and displayed from a full deck of fifty-two cards. The cards of the player hand are revealed whereas only one card of the dealer hand is shown. The player, using an input device, opts to stand, split, double down and take one or more hits to complete his hand according to the rules of the game. The dealer's hand is then revealed and completed. As between the dealer and player, the one having a hand count at or closest to "21" wins the hand. In some implementations, after the hands are completed and compared and any wager paid or collected, a new wager is made and cards are dealt from a fully constituted deck.

In some embodiments, for the table game version of Blackjack, a series of hands are dealt from a deck and the deck is depleted to a point where the deck is re-shuffled.

Baccarat is another known game where, in some implementations, a deck of cards is shuffled to configure the cards into a random, serial order and where multiple hands are dealt from the deck before a point is reached in penetration through the deck where the deck is re-shuffled.

Further, in regards to deck depletion through a series of hands for the play of games of the type described, the same does not occur with respect to some implementations of electronic card games since the deck is fully constituted at the start of each hand. Further, where a deck is depleted over a series of hands, some implementations may include displaying to players the remaining constituency of the depleted deck so they can see the cards available for play. In most jurisdictions, card counting, e.g. a player determining the remaining cards in the deck based upon the cards played (in Blackjack where multiple rounds of hands are played from a deck of cards) is a crime or a basis for ejecting the player from the casino.

In some embodiments, at least for a plurality of hands of play, the cards which have been played deplete the deck for the succeeding hand. In some embodiments, a processor tracks the cards which have been played and therefore can determine and display, if desired, the inventory of cards remaining in the deck for play of the next hand. Some embodiments include a game where the player can order "reshuffling" if he/she desires. Some embodiments include a game of the type described above where re-shuffling of the deck data, if not ordered by the player, is required based upon one or more pre-selected triggers.

Some embodiments include a method and/or electronic device for playing a card game such as a Video Poker game where the deck(s) are randomized (shuffled) into a random, serial order 1-N, where cards for play are selected and displayed in serial order for the deck, where the constituency of the deck. i.e. the remaining cards available for play, are displayed and where the deck is reconstituted and reconfigured into a new, random, serially arranged deck of N cards based upon the count of displayed cards, a command prompt by the player or a pre-determined trigger and where the displayed pay table may be reconfigured to reflect the fact that, based upon depletion of the deck, certain winning outcomes cannot obtained.

Some embodiments include a method and/or device for playing a card game such as a Video Poker game which includes providing a data processor including a first data structure storing data representing at least one deck of N playing cards according to the rules of the game. For example, for some implementations of regular Poker, the first data structure would store data representing each card of a fifty-two card deck. In the first data structure the card data is configured a random, serial order representing a deck of shuffled cards. The player makes a wager and plays a series of hands. For each hand of play, data is selected from the first data structure and displaying at an electronic display data representing an initial holding of at least three playing cards, e.g. a five card Poker hand, the data selected in order from the serially arranged deck data. The player opts to discard one or more of said displayed playing cards of the initial holding, the processor for any discarded card selecting and displaying a replacement card selected in order for the serially arranged deck data to define a final outcome, five card, combination. The final card combination is compared to data stored in a second data structure storing data representing winning outcomes. If the player has obtained a winning outcome an award corresponding to a winning outcome is issued to the player. It should be recognized that this example is non-limiting and that other embodiments may not involve serial orders, such data structures, and/or may include any other elements or methods.

In some embodiments, a processor maintains data representing the constituency of the deck data remaining in the first data structure, e.g. how many Aces-Deuces are left, and displays the constituency of the deck data depleted of said displayed cards. Thus, in some implementations, as cards are selected from the serially arranged deck and before the next hand of play, there is displayed for the player the remaining constituency of the deck which the player may use to guide their decisions as to which cards to discard. It should be recognized that other embodiments may not include such elements or actions and/or may include alternatives.

In some embodiments, the feature of displaying the remaining constituency of the deck through the play of a series of hands may also be incorporated into video versions of Blackjack, Baccarat and other games.

In some embodiments, at a predetermined count of selected cards, the deck data is reconstituted and reconfigured such that the cards are randomly positioned in a serially ordered deck representing a re-shuffled deck. In some embodiments, as new hands are played cards are selected in series form the deck data so as to correspond to dealing of cards from the top of the deck. In some embodiments, reconstitution and reconfiguration may also be triggered, as by the play of the Joker in Joker's Wild Poker or upon prompting by the player.

Figure 7:
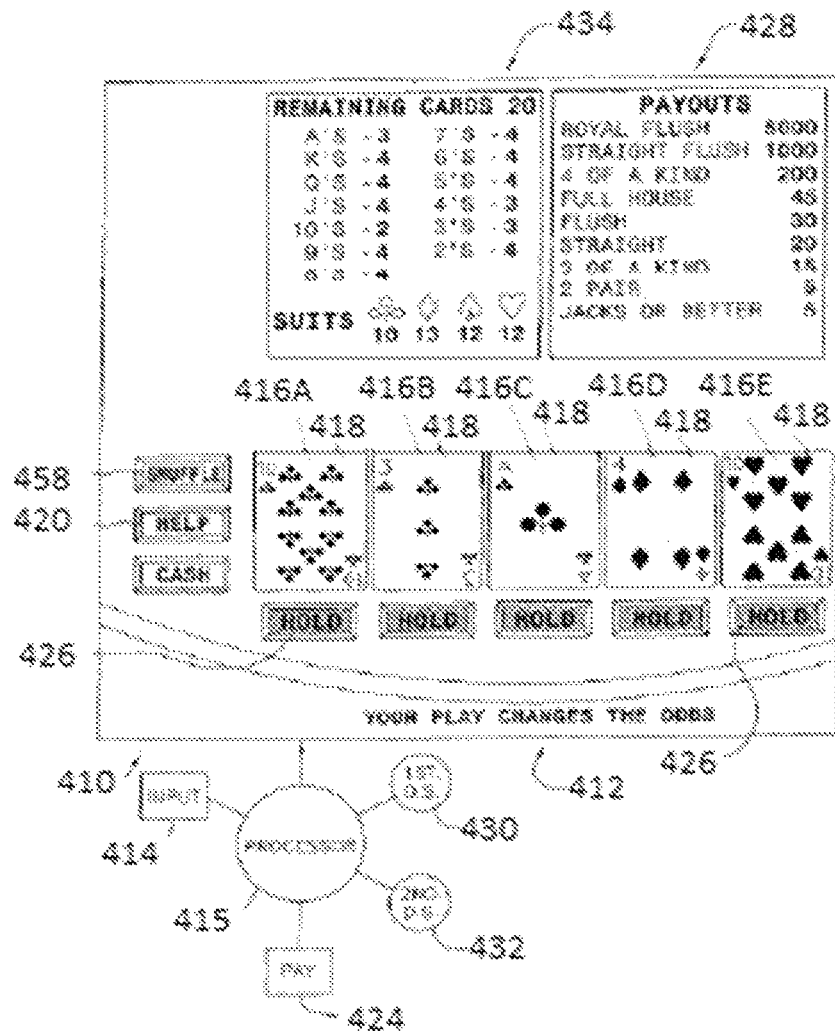
FIG. 7 shows a processor controlled display after the play of one hand of Video Poker.
Figure 8:
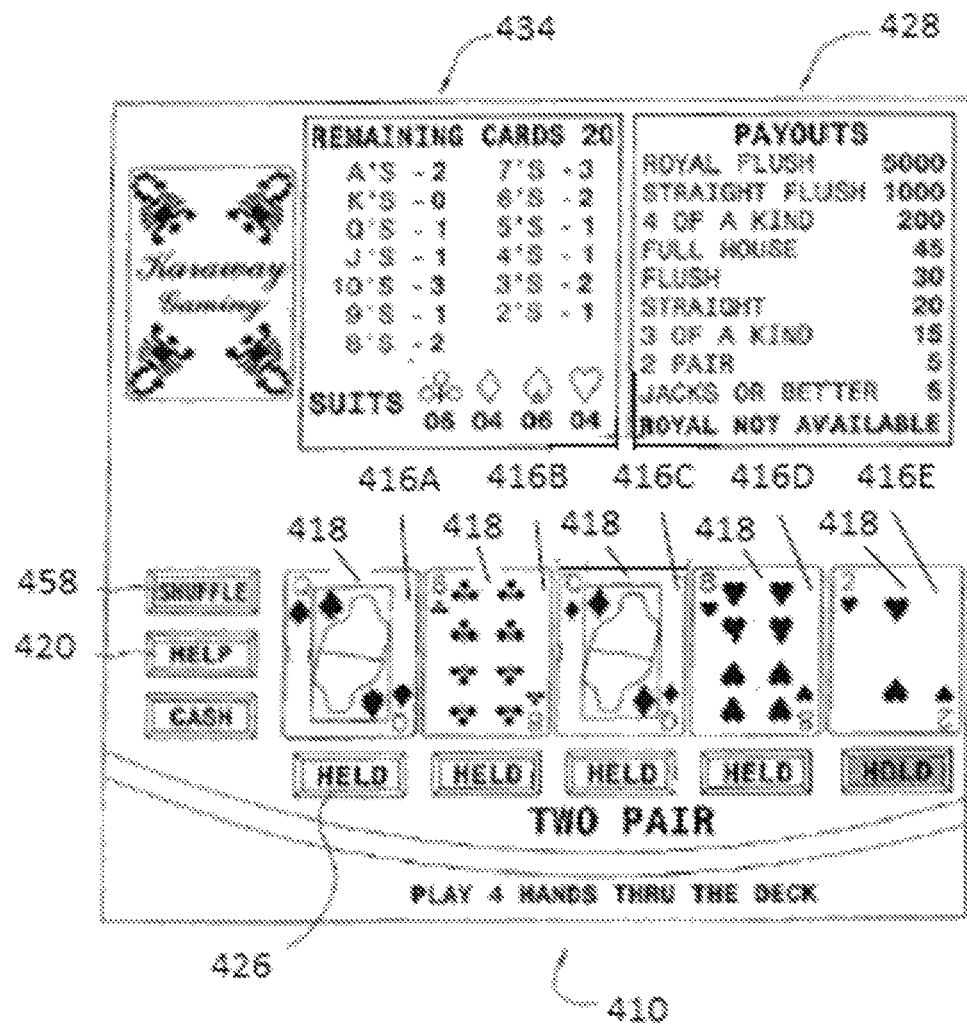
FIG. 8 shows the processor controlled display after the play of another hand of play of Video Poker.

Turning to the drawings, FIGS. 7 and 8 show an electronic display 410 for the game and method according to some embodiments of the present invention. The display 410 may be presented by a video display or plasma display for a gaming machine or on a computer monitor or handheld game display.

With reference to FIG. 7, a device 410 and method for a Video Poker embodiment of the present invention is shown. In some embodiments, the device 410 includes an electronic video display 412 presenting an example of the layout for the play of the game. The device 410 may be incorporated into any platform such as those currently known in the art. For example, the display 412 may be a touch screen display including data input means 414 to control the game/machine processor 415; however it should be understood that other data input means could be used such as machine buttons, mouse, keyboard or the like.

In some embodiments, the display 412 has a locations 416*a* e for the display of the game hand cards 418 during play. During the play of the device 410 and method, cards 418 are displayed in a manner as hereinafter described to play the game method in some embodiments.

Not shown in FIGS. 7 and 8, the device 410 and/or display 412 may include a credit meter, as is known on the art, to keep a tally on the gaming credits available for play and means for the player to input a wager and prompt play of the game. For example, the device may include a cash reader or token acceptor by which the player may input the desired wager as well as input means to wager accumulated credits, again as is known in the art.

To provide information to the player, the display 412 may include a touch screen help button 420 which, if touched by the player, prompts the processor 415 to display helpful information to the player. Also included in some embodiments is a cash out button 422 which if touched by the player prompts the processor 415 to operate a pay device 424 which may be a coin hopper device, voucher writer, credit or debit card writer or a program to transfer accumulated credits to the player's established account.

In some embodiments, to enable the player to hold/discard cards 418, each location 416*a-e* has associated therewith a hold button 426. In some embodiments, as is known in the play of Video Poker, if the player desires to hold a card 418, he/she touches the corresponding hold button 426 which prompts the processor 415 for the game to retain the display of the held card 418. Cards which are not held in the initial hand or holding, are replaced with replacement cards to define the final, outcome, holding. The final holding, as described below, is compared to an established pay table to determine if the player has a winning or losing outcome.

In some embodiments, the processor 415 controls the display 412 to also display a pay table which lists winning outcomes and the pay for each. Data corresponding to winning combinations and the pay or award for each may be stored in a second data structure 432

In some embodiments, data representing the deck of N cards for play of the game is stored in a first data structure 430, such as a digital memory device. Where the deck is a single, standard deck, N=52 cards. The data may be stored in a serial order, each address representing a playing card of the deck. In some embodiments, the data is stored in a fashion to replicate a shuffled deck of playing cards. For example, when newly shuffled for play, the card data is stored in the first data structure 30 as a sequential string of card data representing cards $N_1$ $N_{52}$. In this example, the cards in the addresses $N_1$ $N_{52}$ are not in any suit or value order but instead are randomized simulating a shuffled deck of cards, with the top card being $N_1$ and the bottom card being $N_{52}$. In some embodiments, a random number generator may be used to randomly select cards for each address. Thus, to the processor 415 and first data structure 430, the data is arranged in a fashion similar to that of a shuffled deck of cards in some embodiments. It should be recognized, that these examples are non-limiting, and as discussed below, other embodiments may include other elements and/or methods.

In some embodiments, when the play of the game is prompted after shuffling (reconstitution and reconfiguration of the data), the processor 415 selects the first five addresses $N_1$ $N_5$ in the data structure defining the initial holding and, with that data, displays the corresponding cards at the display in locations 416a-e as shown in FIG. 7. In some embodiments, the next card selected would be $N_6$. In some embodiments, if, on the other hand, the last card displayed form the previous game was at address position $N_{20}$, the processor would access address positions $N_{21}$ $N_{25}$ and display the cards corresponding to those addresses. Of course other arrangements of data may be used to simulate the ordered, serial and random arrangement of cards in a shuffled deck. It should be recognized that these examples are not limiting and that other embodiments may include other methods or elements.

In some embodiments, the processor 415 controls the display 412 to display a table 434 which describe the inventory data representing cards of the first data structure 430. Table 434 is updated as card data is selected and cards displayed to impart information as to the remaining constituency of the data, i.e. how many of each card are left in the inventory.

Figure 9:
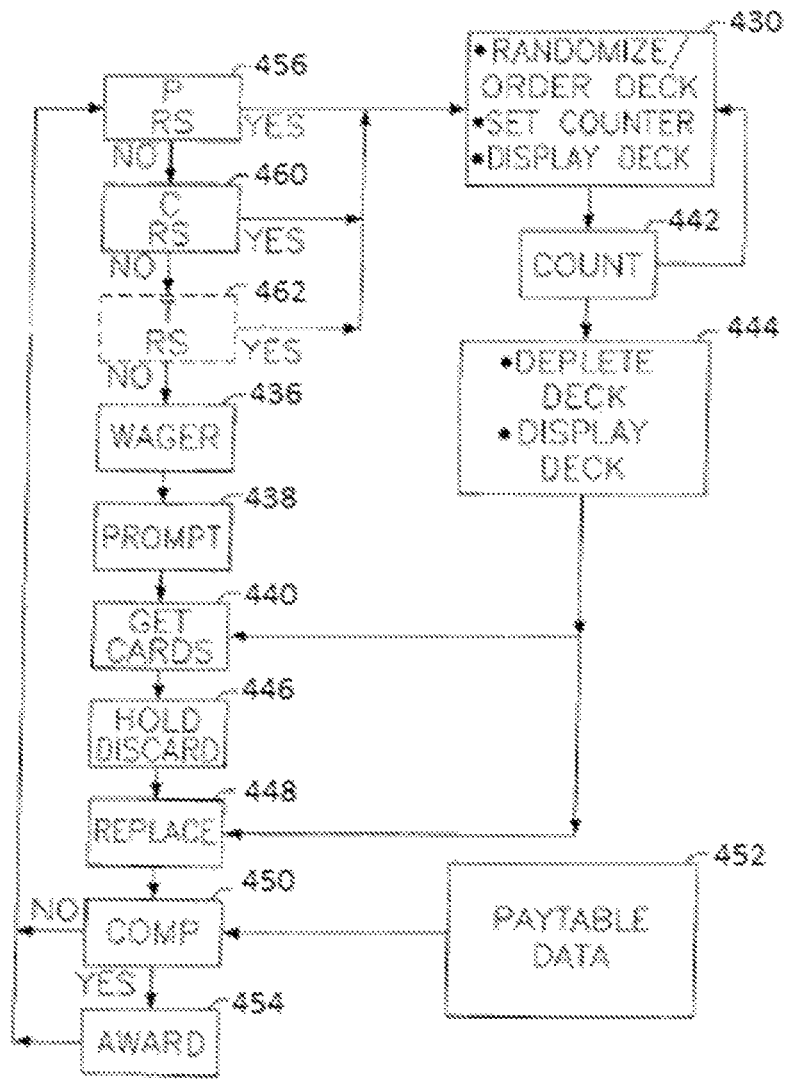
FIG. 9 illustrates a flowchart for a game of Video Poker.

With reference to FIGS. 7 and 9, a method of the play and the device 410 for Video Poker will now be described.

Video Poker

In this example, at 436 the player inputs their desired wager to play a hand of Video Poker and at 438 prompts the processor 415 for play. In this example, the processor 415 accesses the first data structure 430 to get the next cards 418 at 440 in order from the random, serially arranged, deck data. For purposes of discussion and with reference to FIG. 7, it is assumed that the deck data of the first data structure 430 has been re-randomized, reconstituted and serially ordered into data representing a complete shuffled deck of fifty-two cards $N_1$ $N_{52}$. Thus, at 440, the processor 415 gets cards $N_1$ $N_5$ and displays the same at the display 412 as an initial five card holding of, according to this example, 103A410 (FIG. 7). It should be recognized that this is given as an example only.

With continuing reference to the example of FIG. 9, the processor 415 also counts the number of cards which the current hand has depleted from the deck at 442 as well as accounts for the value, and if desired suit, of the cards remaining in the deck data inventory of the first data structure 430. Thus, if the deck data was a full deck of fifty-two cards of a standard deck of playing cards, the deck by the retrieval and display of five playing cards has been (1) depleted of five cards and (2) specifically depleted of cards 103A410. The processor re-tabulates the table 434 to account for the depletion of the deck. That is, before and after the display of the cards of the initial holding the table 434 would be altered as suggested below and as reflected in FIG. 7:

TABLE-US-00001

| Table Before Initial Deal | | Table After Initial Deal | |
|---|---|---|---|
| A`s | 4 | A`s | 3 |
| K`s | 4 | K`s | 4 |
| Q`s | 4 | Q`s | 4 |
| J`s | 4 | J`s | 4 |
| 10`s | 4 | 10`s | 2 |
| 9`s | 4 | 9`s | 4 |
| 8`s | 4 | 8`s | 4 |
| 7`s | 4 | 7`s | 4 |
| 6`s | 4 | 6`s | 4 |
| 5`s | 4 | 5`s | 4 |
| 4`s | 4 | 4`s | 3 |
| 3`s | 4 | 3`s | 3 |
| 2`s | 4 | 2`s | 4 |
| | 52 | | 47 |

(Bold cards reflect deck constituency change)

Thus, in this non-limiting example, at 444 the processor depletes the deck data of the first data structure 430 and displays the remaining constituency of the card data so the player knows which cards remain available for selection and display.

With reference to the example of FIG. 9, at 446 the player selects with the input means 414 which cards of the initial holding to hold. For example, with reference to FIG. 7 the player may decide to hold the 10's. Thus the display 412 would display the cards 418 in the following manner:

TABLE-US-00002

| 10, | 3, | A, | 4, | 10, |
|---|---|---|---|---|
| Hold | | | | Hold |

In this example, upon the player prompting play, at 448 the processor 415 selects from the data stored in the first data structure the next data, e.g. $N_6$ $N_8$ and displays the same as replacements for the discarded cards 3A4. For example, the hand, after replacements may result in a final holding outcome of:

TABLE-US-00003

| 10, | 10, | J, | J, | 10 |
|-----|-----|-----|-----|-----|
| Hold | | | | Hold |

This holding is a Full House.

In this example, in connection with the retrieval of the replacement card data, the processor at 444 depletes the deck data of the data representing the replacement cards (cards 10.diamond., JJ) and displays at the display 412 at table 434 the new constituency of the deck depleted by the replacement card data. Thus the table 434 would be:

TABLE-US-00004

| Table After Initial Deal | | Table After Replacements | |
|---|---|---|---|
| A's | 3 | A's | 3 |
| K's | 4 | K's | 4 |
| Q's | 4 | Q's | 4 |
| J's | 4 | J's | 2 |
| 10's | 2 | 10's | 1 |
| 9's | 4 | 9's | 4 |
| 8's | 4 | 8's | 4 |
| 7's | 4 | 7's | 4 |
| 6's | 4 | 6's | 4 |
| 5's | 4 | 5's | 4 |
| 4's | 3 | 4's | 3 |
| 3's | 3 | 3's | 3 |
| 2's | 4 | 2's | 4 |
| | 47 | | 44 |

(Bold cards reflect deck constituency change)

Thus the player has updated information as to the constituency of the remaining deck data.

In this example, at 450 the processor 415 compares the outcome to data stored in a second data structure 452 representing winning outcomes and the award for each (referred to herein as pay table data) to determine if the player is entitled to an award. If the player has obtained a winning outcome, at 454 the processor 415 issues the appropriate award. Typical pay table data for a five unit wager is as shown at the pay table 428 of FIG. 7. The pays may be linear based upon the tokens wagered or may include one or more higher pays to encourage a maximum coin wager.

In some embodiments, after the award or if no award was won, the processor 415 determines at 456 if the player has prompted re-shuffling of the deck data of the first data structure 430. In some embodiments, the player may prompt reconfiguration and reconstitution of the deck data of the first data structure 430 into data representing a shuffled, random, serially ordered full deck by touching shuffle button 458 (FIG. 7). In some embodiments, the processor 415 reconfigures and reconstitutes the deck data of the first data structure 430 into data representing cards $N_1 \ldots N_{52}$. In some embodiments, the display 412 would also be controlled to show the constitution of the deck data at table 434. In some embodiments, the player may command re-shuffling where the deck constitution, for the next hand of play, is not what the player desires, e.g. is completely depleted of Aces thus making a Royal Flush impossible for the next hand. It should be noted that where deck depletion makes certain outcomes impossible for the next hand, the processor 415 would re-configure the pay table 428 and remove that outcome in some embodiments. For example, if all Kings are depleted from the deck making a Royal Flush impossible, the Royal Flush pay would be removed from the pay table 428.

In some embodiments, if the player does not command re-shuffling, re-shuffling may be commanded based upon the count of the card data which has been displayed. According to some embodiments, where penetration into the deck data reaches a predetermine number, the processor 415 commands reconfiguration and reconstitution of the deck data. For example, if the count exceeds 30 cards, e.g. ($N_1 \ldots N_{31}$), at 60 the deck data is reshuffled before the play of the next hand in some embodiments.

In some embodiments, one or more triggers at 462 may trigger re-shuffling and reconstitution of the deck. For example, where the game is a Joker's Wild version of Video Poker, the display of the Joker in the hand may trigger re-shuffling before the play of the next hand. Other triggers may be depletion of one of A's 10's from the deck (making a Royal Flush impossible) or depletion of all the 2's in a Deuces Wild format game.

In some embodiments where re-shuffling takes place, the table 434 may reflect the re-constitution of the deck.

Table 434 may also display the cards remaining for each suit as shown in the example of FIG. 7.

In some embodiments, whether re-shuffling takes place or not, the player at 436 inputs another wager to play the next hand having the information imparted by the table 434 of the constitution of the deck data.

The example of FIG. 8 illustrates the display 412 after completion of a hand which has depleted the deck data to have a remaining set of 32 cards. Since the next hand could require the selection and display of ten cards (initial holding of five cards where all are discarded and replaced) thereby exceeding a forty card deck penetration, re-shuffling of the deck data would occur prior to the play of the next hand in some examples.

As suggested above, the device and method may be configured to play a Deuces Wild or Joker's Wild game. In some embodiments for Joker's Wild, data is stored in the first data structure 430 representing a standard deck (52 cards) plus at least one Joker for data representing fifty-three cards. In some embodiments only one Joker is included and is "wild" to represent any card in the deck. In some embodiments for Joker's Wild the pay table data stored in the second data structure 432 represents the following winning combinations and awards for a five unit wager:

TABLE-US-00005

| Royal Flush (without Joker) | 5000 |
|---|---|
| 5 of a Kind | 1000 |
| Royal Flush with Joker | 500 |
| Straight Flush | 250 |
| 4 of a Kind | 100 |
| Full House | 35 |
| Flush | 25 |
| Straight | 15 |
| 3 of a Kind | 10 |
| Two pair | 5 |
| Pair of Queens or Better | 5 |

In some embodiments, the processor 415 is programmed to order re-shuffling (reconfiguration and reconstitution) of the deck data upon the first of: (1) where the count the hands played as tracked by the counter 442 is four hands (2) after a hand is played including the Joker, or (3) player commanded re-shuffling.

Blackjack/Baccarat

Figure 10:
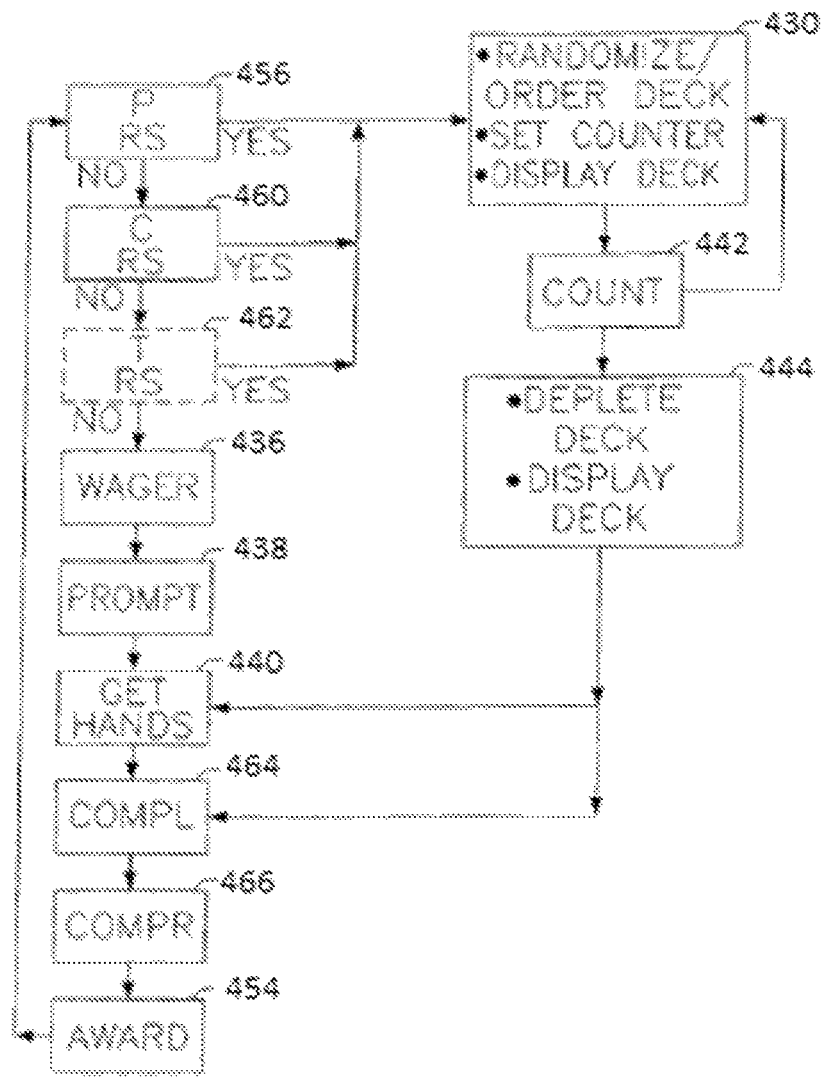
FIG. 10 illustrates a flowchart for a game of Blackjack or Baccarat.

Turning to the example of FIG. 10, there is shown a diagram for the play of Blackjack or Baccarat according to the present invention Like elements bear like reference numbers.

In some embodiments, at 436 the player inputs their desired wager to play a hand of Baccarat or Blackjack and at 438 prompts the processor 415 for play. In some embodiments, the processor 415 accesses the first data structure 430 to get the next cards at 440 in order from the random, serially arranged, deck data. In some embodiments for Blackjack, the processor would select and display two cards for a player hand and two cards for a dealer hand; however for the dealer hand, only one card is exposed. Thus, at 444, the deck data is depleted by four cards displayed for the initial holding and the constituency of the remaining deck is displayed at table 434 in some embodiments.

With continuing reference to FIG. 10, the processor 415 also counts at 442 the number of cards (and/or hands of play, if desired) represented by the current hand as well as accounts for the value, and if desired suit, of the cards remaining in the deck data inventory of the first data structure 430 in this example. For Baccarat or Blackjack, suit is not important and hence may not be accounted for in some implementations.

In some embodiments, at 464 the hands are completed by the player standing, splitting, doubling down, taking a hit according to the rules of Blackjack. The player's action may require the selection and display of additional cards for the player hand. In some embodiments, for additional cards requested by the player, at 444 and as described above, the deck data is selected in order from the serially arranged, randomized deck data, cards are counted at 442, at 444 the deck data is depleted and the new deck constituency is displayed. In some embodiments, the dealer's hand at 464 is also completed which may require selecting and displaying additional cards according to the well-known rules of the game. In some embodiments, for any additional cards for the dealer's hand, cards are counted at 442, at 444 the deck data is depleted and the new deck constituency is displayed. It should be recognized that this example is non-limiting and that other elements and/or methods may be used in other embodiments.

In some embodiments, when the player and dealer hands have been completed, at 466 the hands are compared, according to the well known rules of the game to determine if the player has won the hand. If the player has won at 454 the award is issued to the player and if not, the player's wager is lost and is retained.

In some embodiments, after the award or if no award was won, the processor 415 determines at 456 if the player has prompted re-shuffling of the deck data of the first data structure 430. In some embodiments, the player may prompt reconfiguration and reconstitution of the deck data of the first data structure 430 into data representing a shuffled, random, serially ordered full deck by touching shuffle button 458 (FIG. 7). In some embodiments, the processor 15 reconfigures and reconstitutes the deck data of the first data structure 430 into data representing cards $N_1$ $N_{52}$ for the fifty-two card deck. In some embodiments, the display 412 would also be controlled to show the constitution of the deck data at table 434. In some embodiments, the player may command re-shuffling where the deck constitution, for the next hand of play, is not what the player desires, e.g. is completely depleted of Aces thus making a Blackjack impossible for the next hand. It should be recognized that his example is non-limiting and other embodiments may include other elements or methods.

In some embodiments, if the player does not command re-shuffling, re-shuffling may be commanded based upon the count of the card data which has been displayed or additionally or alternatively, the number of hands which have been played since re-shuffling of the deck. According to some embodiments, where penetration into the deck data or the number of hands of play reaches a predetermine number, the processor 415 commands reconfiguration and reconstitution of the deck data. For example, if the count exceeds 30 cards, e.g. ($N_1$ $N_{31}$), at 60 the deck data is reshuffled before the play of the next hand in some embodiments. Or, in some embodiments, if four hands have been played, re-shuffling may be triggered.

In some embodiments, one or more triggers at 462 may trigger re-shuffling and reconstitution of the deck. For example, where all the Aces have been depleted from the deck (making a Blackjack impossible), re-shuffling may be triggered before the play of the next hand in some embodiments.

In some embodiments, Baccarat is played in the same manner as illustrated in FIG. 10 and described above. The difference is the exposure of all cards and the known draw rules for Baccarat to complete the Player and Banker hands therefore.

The device and method may also be applied to other casino card games such as modified Blackjack, Baccarat or Poker games. Further the method can also be employed in a table game using one or more decks of cards and a card reader to read cards as they are distributed to players.

In some embodiments, selecting a game indicia and/or card may include selecting a value for the card and a suit for the card. In some implementations, the value and suit may be selected separately. The value may include, for example, a face value (e.g., a two, a three, an ace, a king, a queen, etc.) The suit may include, for example, a heart, a spade, a diamond, or a club.

In some embodiments, a value may be selected with reference to an inventory of available game indicia/card or other card data. The value may be selected based on the available game indicia. For example, the value may be selected from the inventory depleted of values that have previously been selected. For example, an inventory may begin with 4 tens, but after a ten has been dealt, the inventory may have only 3 tens. Selecting a value may include using a random number generator to select a value from the remaining inventory of values, and/or any other method of selecting a value from a remaining inventory of values.

In some embodiments, the selected value, may correspond to a generic card without a suit. Unlike embodiments discussed above in which a selected card and/or indicia includes both a value and a suit, in this embodiments, the selected value does not include a suit.

In some embodiments, a suit may be selected from the four possible suits. Accordingly, in a deck, all cards of a value may have the same suit. In some implementations, a game played in this method may have outcomes that are not determined by a suit of a card. Such a game may include blackjack. The suit may be selected by a random number generator or any other method. The suit may be selected without reference to an inventory and/or card data. The suit may be selected separately from the value.

In some embodiments, the inventory or other information about card values remaining in an inventory may be displayed.

In some embodiments, after a value is selected, a number of indicia in an inventory that have the same value may be reduced and/or depleted to reflect the selection of the value. No specific card may be eliminated by such reduction in some examples, because the suit of the cards remaining is determined separately from the value. Accordingly, in some such embodiments, a deck may end up having multiple cards of the same suit even though a standard deck may not have such duplicates.

In some embodiments, a player may not have an option to restore/reshuffle a deck. In such embodiments, at least one additional sequential game hand may be conducted using a finite set/deck data/inventory cumulatively excluding dealt game indicia until an automatic restoration event. Such an event may include, for example, a number of cards being dealt, a number of hands played, a particular state of a shoe, when a cut card is reached, and so on. In some implementations, a virtual card may be placed in a deck at a desired location and when the cut card is reached the deck may be reshuffled/restored. In some implementations, the reshuffle/restore may occur before the start of a next hand. In other implementations, the reshuffle/restore may occur at a time when the automatic event is triggered (e.g., even if it is in the middle of a hand). In some implementations, a cut card may be placed in a deck between a desired range of cards (e.g., in the middle third of a deck), at a random location in a deck, and/or in any other desired location and/or fashion.

Some embodiments may include saving a state of a finite set/deck data/an inventory. Such a state may be saved, for example after a first gaming session. Saving a state may include, for example, storing information describing a current circumstance of a deck, such information may be stored, for example, in a database, and/or on any computer readable medium. A gaming session, for example, may include any number of games played. A gaming session ay end, for example, when a player turns a device used to play the game off, leaves a gaming machine, turns a computer program used to play a device off, switches applications on a computer, visits a different website than the one used to play a game, and/or takes any other action to stop the play of a game.

Some embodiments may include restoring a state of a game at a start of a second gaming session. The start of a gaming session may include any time before play of a game begins (e.g., before cards are dealt, before a player is given an option to make a move in a game, etc.). Restoring a state may include receiving/retrieving stored information. Such information may be retrieved from a database and/or any computer readable medium. Be restoring the state, the player may begin play using a deck that has been depleted to the extent it was depleted in the prior session. Accordingly, a player may be unable to perform a manual restoration by turning a game off and back on, in some such implementations.

In some implementations, information about a state may be stored in a location that may withstand a reset of a gaming device, for example, a permanent storage device such as a hard disk drive. In some implementations, such information may be updated each time a card is dealt so that the information is up to date at all instances.

In some implementations, a first gaming session may take place on a first device and a second gaming device. Each gaming device may have access to the state information (e.g., through a communication network). The state information may be stored for example, on a networked drive or other network accessible storage medium. The state information may be stored on a card or other id that a player carries with her and may be used by the player to start a game (e.g., similar to the well known TITO system storage of money information). In some implementations, a player may end a computer program to end a session and begin a computer program at a same or different device to begin a second session. A computer program may include, for example a java script program, an AJAX program, a web browser, a web based application, a stand alone program, and/or any other program.

In some embodiments, an exclusion/depletion of dealt game indicia/cards such that at least one value of the game indicia/cards is eliminated may result in a restoration of game indicia/cards. For example, in some implementations, if an exclusion of a card from a deck results in no cards having the same value being available for a next hand, a restoration event may occur (e.g., card data may be restored, a deck may be reshuffled, etc.). In some implementations, the number of card values not being available for a next hand may be greater than one. For example, if dealing a hand results in no further 10's and no further 2's, a restoration of the cards may occur.

Some implementations may include determining if such an exclusion results from a depletion of deck data/inventory/a finite set. Such determination may include, for example, referencing a table of available outcomes and/or determining in any other way.

In some implementations, a plurality of values that are eliminated that lead to a restoration event may include all the cards dealt in a game hand. For example, for a game hand in which a 10, a 2, a 4, and a 6 are the only cards dealt, a restoration event may occur if after the dealing, there are no 10s, no 2s, no 4s, and no 6s remaining in the deck. In some implementations, this may be a rare occurrence.

In some embodiments, when an outcome becomes unavailable due to depletion, a display regarding an inventory/deck data may be hidden. For example, in some embodiments, if all outcomes are available based on the constituency of a deck, a display may show information about the constituency; however, if an outcome becomes unavailable due to depletion, the display may be hidden.

In some embodiments, hiding a information may include removing the information from a display (e.g., from a monitor, form a screen, etc.). In some embodiments, hiding information may include preventing the information from being displayed. In some implementations, such information may be displayed under some circumstances, but may be prevented from display under other circumstances.

In some implementations, the number of outcome eliminated based on depletion may be greater than one. For example, in some implementations, the number may include a number equal to all outcomes that are associated with cards dealt in a prior hand. For example, in some implementations, if a two, a king, an ace, and a ten are dealt in a prior hand, then the number may include all outcomes that include any other those cards (e.g., four kings, a straight with any of the cards, etc.).

In some implementations, this hiding of information may affect play by a player. However, such ply may be affected as a deck reaches an end when it is more likely that depletion will have such an effect. It may become easier for a player to track cards as a deck reaches an end than at the beginning of a deck. In some implementations, a player may be presented with a warning that a display of information is about to be hidden so that the player may begin to keep mental track of card/indicia information.

While certain embodiments of the present invention have been described, it should be understood that these embodiments are subject to many modifications and changes without departing from the spirit and scope of the appended claims.

What is claimed is:

1. A method comprising:
   (a) detecting, by at least one processor, a wager from a player to play a game hand in accordance with rules of a base game;
   (b) detecting, by the at least one processor, via a card reader, a card dealt from an available inventory of cards to said player during the game hand;
   (c) updating, by the at least one processor, state of deck data stored in a database of a memory and indicating the available inventory of cards, to reflect a decrease to the available inventory of cards of a card same as each given card detected as dealt in the game hand and dealt in previous game hands, if any;
   (d) when said game hand for said player is completed according to said base game, resolving, by the at least one processor, said wager based at least in part on whether said game hand forms a winning hand;
   (e) updating, by the at least one processor, the state of deck data in the database to reflect a decrease to the available inventory of cards of a card same as each given card detected as dealt, if any, in a subsequent game hand; and
   (f) displaying, by the at least one processor, on a display device, based on the state of deck data, at least one of: the available inventory of cards that has decreased or winning hands eliminated as a result of said decreased available inventory of cards;
   performing (a)-(f) until a restoration event, said restoration event including at least a manual restoration event; and
   upon a restoration event, updating, by the at least one processor, the state of deck data to reflect restoration of the available inventory of cards.

2. The method of claim 1, wherein the base game includes blackjack.

3. The method of claim 1, wherein the state of deck data indicates for each card in the available inventory of cards a value and a suit from four possible suits.

4. An apparatus comprising:
   at least one processor and a memory including instructions which, when executed by the at least one processor, control:
   for each of a plurality of first rounds of a game:
      (a) detecting, via a card reader, a respective plurality of game cards dealt from a set of game cards to make up a respective outcome, in which the set of game cards includes a plurality of subsets that each include a respective at least two game cards, and
      (b) updating state of deck data stored in a database of a memory and indicating an available inventory of cards of the set of game cards, to reflect the plurality of game cards detected as dealt as being removed from the available inventory of cards of the set of game cards for play in subsequent rounds of the plurality of first rounds;
   for a plurality of second rounds of the game, detecting, via the card reader, a respective second plurality of game cards dealt from the set of game cards using the available inventory of cards and updating the state of deck data to reflect the second plurality of game cards detected as dealt as being removed from the available inventory of cards, until an automatic restoration event,
   in which the automatic restoration event includes all game cards of the set of game cards having each of a plurality of particular numerical values being eliminated and the automatic restoration event causes the set of game cards to be restored; and
   prior to play of at least some of the first rounds, displaying, on a display device, based on the state of deck data, a number of game cards remaining in each subset of the plurality of subsets after the state of deck data has been updated to reflect game cards detected as being dealt have been removed from the available inventory of cards of the set of game cards.

5. The apparatus of claim 4, wherein the instructions, when executed by the at least one processor, control displaying, on the display device, based on the state of deck data, information indicating at least one of a makeup of the available inventory of cards of the set of game cards after game cards have been removed or a makeup of the game cards that have been removed from the available inventory of cards of the set of game cards.

* * * * *